United States Patent
Riebel et al.

(10) Patent No.: US 9,156,209 B2
(45) Date of Patent: Oct. 13, 2015

(54) BIOOPTICAL AND BIOFUNCTIONAL PROPERTIES, APPLICATIONS AND METHODS OF POLYLACTIC ACID FILMS

(75) Inventors: Michael J. Riebel, Mankato, MN (US); Milton Riebel, Mankato, MN (US); Ryan W. Riebel, North Mankato, MN (US)

(73) Assignee: Green Bubble Technologies LLC, Mankato, MN (US)

( * ) Notice: Subject to any disclaimer, the term of this patent is extended or adjusted under 35 U.S.C. 154(b) by 912 days.

(21) Appl. No.: 13/189,331

(22) Filed: Jul. 22, 2011

(65) Prior Publication Data

US 2012/0019917 A1    Jan. 26, 2012

Related U.S. Application Data

(60) Provisional application No. 61/366,617, filed on Jul. 22, 2010, provisional application No. 61/366,620, filed on Jul. 22, 2010, provisional application No. 61/366,624, filed on Jul. 22, 2010.

(51) Int. Cl.
*B29C 70/58* (2006.01)
*B44C 5/04* (2006.01)
*B01D 53/86* (2006.01)
(Continued)

(52) U.S. Cl.
CPC .......... *B29C 70/585* (2013.01); *B01D 53/8668* (2013.01); *B01D 53/885* (2013.01); *B01J 21/063* (2013.01); *B01J 31/061* (2013.01); *B01J 35/004* (2013.01); *B01J 37/0215* (2013.01); *B44C 1/24* (2013.01); *B44C 5/04* (2013.01); *B82Y 30/00* (2013.01); *G02B 1/04* (2013.01); *G02B 5/0278* (2013.01); *B01D 2255/20707* (2013.01); *B01D 2255/802* (2013.01); *B01D 2257/708* (2013.01); *B01D 2257/7022* (2013.01); *B01D 2257/90* (2013.01); *B01D 2257/91* (2013.01);
(Continued)

(58) Field of Classification Search
USPC .......... 264/109, 122, 123, 124, 126, 911, 915
See application file for complete search history.

(56) References Cited

U.S. PATENT DOCUMENTS 3,367,917 A    2/1968  Granito
3,402,066 A *  9/1968  Caffray .................. 427/217
(Continued)

FOREIGN PATENT DOCUMENTS

CA    2278688 A1    6/1999
CA    2509647        12/2006
(Continued)

OTHER PUBLICATIONS

Ooka et al. "Prevention of photocatalytic deterioration of resins using T102 pillared fluoromica", Applied Clay Science, Elsevier Science, vol. 42, No. 3-4, pp. 363-367 (Jan. 1, 2009).
(Continued)

*Primary Examiner* — Atul P. Khare
(74) *Attorney, Agent, or Firm* — Winthrop & Weinstine, P.A.

(57) ABSTRACT

Biopolymers that may be used in optical applications are provided. Suitable biopolymers include polylactic acid and polylactic acid blends. The polylactic acid may be used with a photocatalyst such as titonium dioxide in some embodiments. In other embodiments, the polylactic acid may incorporate decorative fused recycled particles. Generally, the biopolymer may be used in applications where optical characteristics and/or fire performance are desired.

6 Claims, 2 Drawing Sheets

(51) Int. Cl.
*B01D 53/88* (2006.01)
*B01J 21/06* (2006.01)
*B01J 31/06* (2006.01)
*B01J 35/00* (2006.01)
*B01J 37/02* (2006.01)
*B44C 1/24* (2006.01)
*B82Y 30/00* (2011.01)
*G02B 1/04* (2006.01)
*G02B 5/02* (2006.01)

(52) U.S. Cl.
CPC ....... *B01D2259/804* (2013.01); *C02F 2305/10* (2013.01); *Y02W 10/37* (2015.05)

(56) References Cited

U.S. PATENT DOCUMENTS

| | | | |
|---|---|---|---|
| 3,407,154 | A | 10/1968 | Casebolt et al. |
| 5,082,605 | A | 1/1992 | Brooks et al. |
| 5,088,910 | A | 2/1992 | Goforth et al. |
| 5,096,046 | A | 3/1992 | Goforth et al. |
| 5,474,722 | A | 12/1995 | Woodhams |
| 5,480,602 | A | 1/1996 | Nagaich |
| 5,516,472 | A | 5/1996 | Laver |
| 5,593,625 | A | 1/1997 | Riebel et al. |
| 5,635,123 | A * | 6/1997 | Riebel et al. .................. 264/125 |
| 5,636,123 | A | 6/1997 | Rich et al. |
| 5,827,462 | A | 10/1998 | Brandt et al. |
| 5,863,480 | A | 1/1999 | Suwanda |
| 5,866,264 | A | 2/1999 | Zehner et al. |
| 5,882,774 | A | 3/1999 | Jonza et al. |
| 5,919,422 | A | 7/1999 | Yamanaka et al. |
| 5,952,105 | A | 9/1999 | Medoff et al. |
| 5,973,035 | A | 10/1999 | Medoff et al. |
| 6,011,091 | A | 1/2000 | Zehner |
| 6,117,924 | A | 9/2000 | Brandt |
| 6,207,729 | B1 | 3/2001 | Medoff et al. |
| 6,758,996 | B2 | 7/2004 | Monovoukas et al. |
| 6,924,014 | B2 | 8/2005 | Ouderkirk et al. |
| 7,045,555 | B2 * | 5/2006 | Takagi ............................ 521/48 |
| 7,297,394 | B2 | 11/2007 | Khemani et al. |
| 7,615,275 | B2 | 11/2009 | Foerg et al. |
| 2003/0165702 | A1 | 9/2003 | Disse et al. |
| 2005/0075423 | A1* | 4/2005 | Riebel et al. ..................... 524/17 |
| 2005/0241759 | A1 | 11/2005 | Goodson et al. |
| 2006/0199729 | A1 | 9/2006 | Naganuma et al. |
| 2008/0134939 | A1 | 6/2008 | Arpac et al. |
| 2009/0275464 | A1 | 11/2009 | Horiuchi et al. |
| 2010/0015420 | A1* | 1/2010 | Riebel et al. .................. 428/203 |

FOREIGN PATENT DOCUMENTS

| | | | |
|---|---|---|---|
| EP | 0916411 | | 5/1999 |
| GB | 2473727 | A | 3/2011 |
| JP | 08311326 | A * | 11/1996 |
| WO | WO 2009120311 | A2 * | 10/2009 |
| WO | 2011012935 | A2 | 2/2011 |
| WO | 2012009552 | | 1/2012 |
| WO | 2012012765 | | 1/2012 |

OTHER PUBLICATIONS

International Search Report for related PCT Application No. PCT/US2011/045084 mailed Apr. 20, 2012 (7 pp.).

International Search Report for related PCT Application No. PCT/US2011/044035 mailed Sep. 7, 2011 (4 pp.).

* cited by examiner

BIOOPTICAL AND BIOFUNCTIONAL PROPERTIES, APPLICATIONS AND METHODS OF POLYLACTIC ACID FILMS

This application claims priority to U.S. Provisional Application No. 61/366,617, filed Jul. 22, 2010; U.S. Provisional Application No. 61/366,620, filed Jul. 22, 2010; and to U.S. Provisional Application No. 61/366,624, filed Jul. 22, 2010, the content of all of which is hereby incorporated in its entirety by reference.

This application is related to U.S. patent application Ser. No. 13/182,910, filed Jul. 14, 2011, which is a Continuation-in-Part of U.S. patent application Ser. No. 13/019,060, filed Feb. 1, 2011, which is a Continuation of U.S. patent application Ser. No. 12/410,018, filed Mar. 24, 2009, which claims priority to U.S. Provisional Application No. 61/038,971, filed Mar. 24, 2008. This application also claims priority to U.S. Provisional Application Nos. 61/364,298 filed Jul. 14, 2010; 61/364,189 filed Jul. 14, 2010; 61/364,181 filed Jul. 14, 2010; 61/364,345 filed Jul. 14, 2010; 61/364,366 filed Jul. 14, 2010; 61/364,301 filed Jul. 14, 2010; 61/364,193 filed Jul. 14, 2010; and 61/479,140 filed Apr. 26, 2011. The contents of all above-mentioned applications are hereby incorporated in their entirety by reference.

BACKGROUND

Photocatalytic Reactions

In chemistry, photocatalysis is the acceleration of a photoreaction in the presence of a catalyst. In catalysed photolysis, light is absorbed by an adsorbed substrate. In photogenerated catalysis, the photocatalytic activity (PCA) depends on the ability of the catalyst to create electron-hole pairs, which generate free radicals (hydroxyl radicals: .OH) able to undergo secondary reactions. Its comprehension has been made possible ever since the discovery of water electrolysis by means of the titanium dioxide ($TiO_2$). Commercial application of the process is called Advanced Oxidation Process (AOP). There are several methods of achieving AOP's, that can but do not necessarily involve $TiO_2$ or even the use of UV light. Generally the defining factor is the production and use of the hydroxyl radical A principle of photocatalytic reaction is to accelerate the nature's cleaning and purifying process using light as energy. Discovered in 1960's, Dr. Fujishima of Japan found titanium metal, after irradiation by light, could break water molecules into oxygen and hydrogen gas. By restructuring titanium dioxide particles in nano-scale, a number of new physical and chemical properties were discovered. One of these properties was photocatalytic oxidation which accelerated the formation of hydroxyl radical, one of the strongest oxidizing agents created by nature. Using energy found in the UV light, photocatalyst titanium dioxide can breakdown numerous organic substances such as oil grime and hydrocarbons from car exhaust and industrial smog, volatile organic compounds found in various building materials and furniture, organic growth such as fungus and mildew. Titanium dioxide coatings thus may be useful for oxidation. In addition to its photocatalytic oxidation effect, a titanium dioxide coating exhibits a hydrophilic property (or high water-affinity). More specifically, the titanium dioxide coating attracts water moist in the air to form an invisible film of water. This thin film of water allows the substrate to be anti-static so the coated surface may be easily cleaned by rinse of water. Titanium dioxide thus has been incorporated into commodity products such as paint, cosmetics, sun blocks, and etc. Numerous applications have been developed from utilizing photocatalytic reaction.

When photocatalyst titanium dioxide ($TiO_2$) absorbs ultraviolet radiation from sunlight or an illuminated light source (e.g., fluorescent lamps), it produces pairs of electrons and holes. The electron of the valence band of titanium dioxide becomes excited when illuminated by light. The excess energy of this excited electron promotes the electron to the conduction band of titanium dioxide therefore creating the negative-electron (e−) and positive-hole (h+) pair. This stage is referred as the "photo-excitation" state. The energy difference between the valence band and the conduction band is known as the "Band Gap." Wavelength of the light necessary for photo-excitation is: 1240 (Planck's constant, h)/3.2 ev (band gap energy)=388 nm.

The positive-hole of titanium dioxide breaks apart the water molecule to form hydrogen gas and hydroxyl radical. The negative-electron reacts with oxygen molecule to form super oxide anion. This cycle continues when light is available Photocatalytic oxidation is achieved when UV light rays are combined with a $TiO_2$ coated filter. This process creates hydroxyl radicals and super-oxide ions, which are highly reactive electrons.

These highly reactive electrons aggressively combine with other elements in the air, such as bacteria and Volatile Organic Compounds (VOCs), harmful pollutants such as formaldehyde, ammonia and many other common contaminants released by building materials and household cleaners generally found in the home. Effective oxidation of the pollutants breaks down into harmless carbon dioxide and water molecules, drastically improving the air quality.

$TiO_2$ as a Photocatalyst

Titanium dioxide ($TiO_2$) is a potent photocatalyst that can break down almost any organic compound when exposed to sunlight. Titanium dioxide is a well-known photocatalyst for water and air treatment as well as for catalytic production of gases. The general scheme for the photocatalytic destruction of organics begins with its excitation by suprabandgap photons, and continues through redox reactions where OH radicals, formed on the photocatalyst surface, play a major role. Titanium dioxide is non-toxic.

$TiO_2$ has been used in the development of a wide range of environmentally beneficial products, including self-cleaning fabrics, auto body finishes, and ceramic tiles. Other experiments with $TiO_2$ involve removing the ripening hormone ethylene from areas where perishable fruits, vegetables, and cut flowers are stored; stripping organic pollutants such as trichloroethylene and methyl-tert-butyl ether from water; and degrading toxins produced by blue-green algae.

Mechanism of Photocatalytic Chemistry of $TiO_2$ Nanotechnology

Biopolymers

With growing environmental concerns over petrochemical products and environmentally harmful practices, new environmentally friendly polymers are being developed as a replacement for petrochemical based plastics. Materials such as PLA (polylactic acid) such as produced by Natureworks (Cargill) are derived from natural and rapidly renewable resources of corn. To date the vast majority of interest and commercialization is the application of PLA has been for disposable packaging and other disposable products. Although thought of as a disposable plastic, PLA has many abilities and functions that can further expand the usage of this environmentally friendly biobased technology.

Polylactic acid is not derived from petrochemical materials, but from the conversion of starch or cellulosic materials such as corn, wheat, sugar cane, and the starch sources into dextrose then into a lactic acid. The lactic acid is then polymerized into a range of polymer products. Because PLA is not petrochemical based, it has functional and processing abilities outside that of petrochemicals.

Plastics, such as acrylic, polystyrene, PE, PP and most all petrochemical plastics, typically block UV. Currently fused quartz mineral is used for UV transparent applications, but is both difficult and expensive to shape or form into shapes. Further, quartz mineral can not be easily softened to fuse nanominerals onto its surface. Currently few materials are UV transparent and most are expensive or classified as a hazardous material. Materials such as quartz or sapphire have been used in some industries providing a high degree of UV stability. These material have limitations in cost and fabrication among others.

Other engineered polymers such as fluropolymers have been used in UV transparent applications, but are hindered by cost and health considerations. Law suits have been won suing company's based on fluropolymer emissions and pollution.

PLA is a thermoplastic polyester derived from field corn of 2-hydroxy lactate (lactic acid) or lactide. The formula of the subunit is: —[O—CH(CH3)-CO]— The alpha-carbon of the monomer is optically active (L-configuration). The polylactic acid-based polymer is typically selected from the group consisting of D-polylactic acid, L-polylactic acid, D,L-polylactic acid, meso-polylactic acid, and any combination of D-polylactic acid, L-polylactic acid, D,L-polylactic acid and meso-polylactic acid. Some, a polylactic acid-based materials include predominantly PLLA (poly-L-Lactic acid). The number average molecular weight may be about 140,000, although a workable range for the polymer is between about 15,000 and about 300,000. In one embodiment, the PLA is L9000™ (Biomer, Germany), apolylactic acid)

Polylactic acid has a relatively high specific gravity as compared to common plastics with a specific gravity closer to engineered plastics such as polycarbonate. Although similar in specific gravity to polycarbonate used in various functional arid optical products, PLA has a much lower refractive index. In addition due to the unique molecular structure and materials, PLA is virtually transparent in UV wavelength spectrum as compared to polycarbonate and common plastics that have very high UV absorption rates. From this PLA does not have visible or UV degradation or yellowing as found in common plastics. UV transparency and a low refractive index can have a myriad of applications.

UV Resistance and UV Transparency

It has been discovered the PLA has very good UV resistance in regards to UV degradation. Various tests have been performed showing that PLA does not yellow when exposed to exterior light. In addition, tests based on UV-visible photo-spectrometers show that PLA is transparent to UV A, UV B, and in most of the UV C ranges. This shows that the material allows substantially full transmission of UV waves.

Other materials such as polycarbonate have high degrees of clarity in the visible light spectrum but have high degrees of UV absorption. Most polymers are carefully measured for their UV absorption due to the fact that the absorption of UV has a significant relationship to UV degradation of the polymer. Polymers vary greatly in their resistance to weathering. For example, such as polymethylathacrylate (PMMA) and polytetrafluosoethylene (PTFE) are transparent to UV radiation and hence not susceptible to photodegradation. Materials such as PTFE and PMMA are considered "UV Transparent" materials According to data obtained, the following show a specific wavelength wherein the material starts to absorb UV-visible wavelengths:

| PET | 420 nm |
| Polycarbonate | 330 nm |
| PLA | 240 nm |

UV or ultra violet radiation is a shorter wavelength than visible light spectra. The following represents the areas of various UV energy classifications:

| UV A | Long wave (black light) | 315 to 400 nm |
| UV B | UB Medium wave | 280 to 315 nm |
| UV C | Short wave (germicidal) | 100 to 280 |

PLA starts absorption at a much shorter UV wavelength and in addition the amount of absorption is lower than that of a high quality PET.

PLA also has a high surface energy. PLA has a similar range of refractive index as fluoropolymers, but with much higher surface energy.

Polylactic acid has a specific gravity typically around the 1.25 range and can produced in a transparent form. Common plastics for optical and other functional applications such as polycarbonate have specific gravities of typically 1.2 to 1.22 but are UV opaque.

Optical properties such as refractive index, UV absorption/transmission and UV resistance are important issues related to optical applications.

Refractive Index

The refractive index or index of refraction is a ratio of the speed of light in a vacuum relative to that speed through a given medium (this quantity does not refer to an angle of refraction, which can be derived from the refractive index using Snell's Law). As light passes from one medium to another, for example from air to water, the result is a bending of light rays at an angle. This physical property occurs because there is a change in the velocity of light going from one medium into another. Refractive index also describes the quantity that light is bent as it passes through a single substance. This involves calculating the angle at which light enters the medium and comparing that with the angle at which the light leaves the medium.

Another view rates each substance with its own refractive index. This is because the velocity of light through the substance is compared as a ratio to the velocity of light in a vacuum. The velocity at which light travels in a vacuum is a physical constant, and the fastest speed at which energy or information can travel. However, light travels slower through any given material, or medium, that is not a vacuum. This is actually a delay from when light enters the material to when it leaves; i.e., when some is absorbed, and another part transmitted. The following shows various refractive indices of plastics:

| Specific Gravity | Refractive Index |
|---|---|
| Polycarbonate 1.2-1.22 | 1.58 |
| Polylactic Acid 1.24-1.25 | 1.46 note: Range with blending (1.4 to 1.55) |

The difference of refractive index between PLA and conventional petrochemical polymers also provides other potential functional features including electrical dielectric strength. The dielectric constant (which is often dependent on wavelength) is the square of the (complex) refractive index in a non-magnetic medium (one with a relative permeability of unity). The refractive index is used for optics in Fresnel equations and Snell's law; while the dielectric constant is used in Maxwell's equations and electronics. The dielectric constant of PLA is lower than conventional petrochemical plastics and has various applications in electrical components and systems.

Fluoropolymers have been investigated for a wide range of optical applications because of their possible optical clarity and because their refractive indices are generally much lower than competing materials such as PMMA and PC. The refractive index for most fluoropolymers is in the region of 1.30 to 1.45 compared with the refractive index for more traditional transparent polymers such as PMMA and PC where it is in the region of 1.5 to 1.6 (or higher). This makes the fluoropolymers suitable for optical technology products such as waveguides, optical filters, fiber gratings and a wide range of optical devices. Specialist ultra-transparent fluoropolymers are also being developed for these applications and for use in rapidly developing CMOS lithography technologies essential for the production of semiconductor devices. The optical clarity and other performance properties of fluoropolymers are opening new markets and opportunities.

The usage of dissimilar materials with various refractive indexes are used for a wide range of applications for antireflective coatings, LCD flat panel screen assemblies, general optical lensing and other similar applications. A lower or different refractive index of PLA in combination with a convention higher refractive index can have unique applications and provide a tool for design of new optical based systems.

Luminous Transmittance

Luminous transmittance for various materials is provided below.

| | |
|---|---|
| Optical glass | 99.9 |
| PMMA | 92 |
| PC | 89 |
| SAN | 88 |
| PS | 88 |
| ABS | 79 |
| PVC | 76 |

Encapsulants for Light Emitting Diodes (LEDs)

Typical encapsulants for LEDs are organic polymeric materials. Encapsulant lifetime is a significant hurdle holding back improved performance of high brightness LEDs (HB LEDs). Conventional LEDs are encapsulated in epoxy resins that, when is use, tend to yellow over time thereby reducing the LED brightness and changing the color rendering index of the light emitted from the light emitting device. This is particularly important for white LEDs. The yellowing of the epoxy is believed to result from decomposition induced by the high operating temperatures of the LED and/or absorption of UV-blue light emitted by the LED.

Another problem that can occur when using conventional epoxy resins is stress-induced breakage of the wire bond on repeated thermal cycling. High brightness LEDs can have heat loads on the order of 100 Watts per square centimeter. Since the coefficients of thermal expansion of epoxy resins typically used as encapsulants are significantly larger than those of the semiconductor layers and the moduli of the epoxies can be high, the embedded wire bond can be stressed to the point of failure on repeated heating and cooling cycles. Thus, there is a need for new photochemically stable and thermally stable encapsulants for LEDs that reduce the stress on the wire bond over many temperature cycles.

With growing research in the area of UV LED, there continues to be a need to improve efficiencies, provide unique UV lensing and optical effects, remove hazardous materials, improve adhesion of encapsulant materials and provide lower cost alternative for LED encapsulant materials.

Currently silicone is a preferred petrochemical polymer used for encapsulating of LED or used within LED lensing due to its refractive index, low UV absorption and other physical and optical properties. Silicone has draw backs with low adhesion properties, petrochemical based, expensive (in optical quality), etc.

Scattering efficiencies is the ratio of photons emitted from the LED lamp to the number of photons emitted from the semiconductor, ship. This accounts for scattering losses in the encapsulant of the lamp.

Encapsulants Based on Silicone

Advantages:

Thermal stability −115 to +260 C

Low Modulus

Low shrinkage

Low moisture absorption

Low ionic content

Low outgassing

Dielectric Strength

Optical clarity—95% transmission at 400 Nm

Refractive index 1.38 to 1.61.

Challenges:

Adhesion to substrate

UV effects on yellowing

Power effect on yellowing.

A key aspect of good high brightness LED packaging design is the physical and optical characteristics of the material used to bond and hold adjacent components together when used as encapsulants, phosphor coatings and lenses. Silicone based materials offer many such advantages.

Silicone Characteristics—Optical:

| | |
|---|---|
| Optical transmission in the UV-visible region | 99% @ 400-800 nM |
| High clarity | 95% |
| Refractive index | 1.38 to 1.58 |

Transmission: Silicones have less than 1% absorption in the UV visible wavelength with very little scattering loss.
Note:
that certain silicones grades are more prone than others to degradation after prolonged UV exposure which is observed as a characteristic yellowing of the material.

Lighting Lenses

The drop ceiling commercial lighting industry uses metal housings with flourescent tubes to provide indoor lighting. Typically an acrylic or polystyrene sheet lens or diffuser is inserted below the fluorescent tubes to disperse the light in the room and also to protect people if the tubes break.

Currently polystyrene is listed as a probable carcinogen by the US Government as a potential cancer causing agent. Both polystyrene and acrylics are petrochemically derived and are fire accelerators. They have a low limited oxygen index and burn in normal atmospheric oxygen levels. In addition they both have a high smoke index, high heat density and produce toxic smoke during combustion.

Fire safety is of key interest in the interior furnishing area for public occupancy buildings. Current lighting lenses and diffusers are produced from petrochemical based acrylic or polystyrene which has many negative issues related to fire. Acrylics and polystyrene burns vigorously and generates heat rapidly when involved in fire.

Fire safety issues and codes relates to the following issues:

Combustion (limited oxygen index)

Flame Propagation

Ignition Characteristics

Smoke Generation

Heat Generation

Light Diffusing Panels

With growing environmental concerns and demand for more "greener" products, there is an increased demand for materials that are derived from rapidly renewable or recycled resources and replaces hazardous and non-renewable petrochemical products. In addition, there is market demand for a low cost process that can process a wide range of recycled plastics and convert them into highly aesthetic durable goods thus removing this material from landfills.

Certain plastic waste such as compact discs from industrial scrap or postconsumer sources are difficult and expensive to recycle due to the metallization layer of the backside of the CD and the colored ink printing on the front. Other recycled material like polylactic acid biopolymers from the production of water bottles are found in high volumes. In the production of these water bottles, trimming scrap is produced during bottle production and cannot be recycled back into bottles. Other mixed semitransparent plastic waste is also problematic for recycled especially when there is mixed colors with the clear or semitransparent plastic and are virtually impossible to sort.

There is a growing demand in architectural designs to create light transmittance diffusing privacy panels that can allow light to pass, but provide sufficient optical diffusion for privacy. Current technology use transparent sheet plastic with optional inclusions that are melted together to form these panels. This process is slow and expensive. The resulting panels are expensive and aesthetic inclusions are highly labor intensive insofar as they are hand laid up between the sheets prior to pressing processes.

The usage of recycled plastic for simple compression molding into sheets or screw extrusion into sheet is known. Generally, the materials are mixed or blended and fully melted into a homogenous material.

U.S. Pat. Nos. 5,593,625 and 5,635,123 (Riebel) discloses a biocomposite board formed from waste newsprint in combination with a water based soybean resin designed with similar characteristics of a composite wood panel. This composite board requires finishing as hardwoods and is not water proof. This art was designed as a replacement for hardwood based on water based proteinous resin integrated with cellulose.

Filled composite materials are known that are based on thermoplastic polymers and wood or agricultural fiber compounds with various additives, which are manufactured using high volume processes such as injection molding or extrusion. These materials are typically done as homogenous composites designed for structural applications such as decking, windows, fencing, siding and other exterior applications. The art includes thermosetting compounds containing cellulosic fiber as a filler. For example, U.S. Pat. No. 3,367,917 describes a thermosetting melamine resin molding composition containing fibrous filler such as cellulose from about 25% to 42% by weight. U.S. Pat. Nos. 3,407,154 and 3,407, 154 describe thermosetting urea-formaldehyde resin molding composition comprising of fusible reactive urea resin and pure cellulosic fibers. This art is based on homogenous composite materials designed for structural applications.

Numerous patents issued in the 1990s concern composite materials comprising polyethylene (high- or low-density, HDPE and LDPE, respectively) and cellulose fibers. U.S. Pat. Nos. 5,082,605, 5,088,910 and 5,096,046 disclose a composite made of 40% to 60% of plastic (LDPE, or a combination of 60% LDPE and 40% HDPE, or having 10-15% of polypropylene of the total amount of plastic) and about 60% to 40% of wood fiber. U.S. Pat. No. 5,474,722 describes a composite material 20% to 80% of which a cellulosic material (ground wood, sawdust, wood flour, rice hulls, etc.) and polyethylene.

U.S. Pat. No. 5,480,602 discloses a composite comprising polypropylene, polyethylene, or their combination along with lignocellulosic particles (50% to 70% by weight) and a polyurethane coupling agent (15 to 3% by weight of the mixture). U.S. Pat. No. 5,516,472 discloses a composite having approximately 26% HDPE and 65% wood flour, extruded in the presence of zinc stearate (2%) as a lubricant along with phenolic resin and polyurethane as minor additives and cross-linking agents (4% and 1.3%, respectively).

U.S. Pat. Nos. 5,827,462, 5,866,264, 6,011,091 and 6,117, 924 describe extruded thermoplastic composites comprising 20% to 40% HDPE or polyvinyl chloride, and 50% to 70% of wood flour, along with 0.5%-2% of lubricants (zinc stearate or calcium stearate) and other minor additives. The foregoing four patents contain an example of the composite (Recipe A and B) showing HDPE and PVC at 26% by weight, wood flour at 66%, and the above-indicated amount of lubricants and other minor additives.

U.S. Pat. No. 5,863,480 discloses a thermoplastic composite of polyethylene, polypropylene, vinyls or other extrudable plastics, cellulosic fiber such as saw dust, wood flour, ground rice hulls, etc., fillers and lubricants. The patentees describe the extrusion occurring through a die at a temperature below the melting point of the polymer, so that the deformation of the polymer takes place in the solid phase, making the product biaxially oriented.

Canadian Patent No. 2,278,688 discloses a thermoplastic composite material 50% to 60% of which is polyethylene or polypropylene, 10% to 30% of which is wood powder, and 10% to 35% of which is a silicate (mica).

U.S. Pat. No. 5,952,105 describes a thermoplastic composition comprising sheared poly-coated paper (50% to 70% by weight) and polyethylene (30% to 50%). An example provided in the patent describes making an 80 g batch of a compression molded composite comprising HDPE (39%), a poly-coated paper (scrap milk jugs, 59%) and a coupling agent (Polybond 3009, 2%).

U.S. Pat. No. 5,973,035 by the same authors describes a similar thermoplastic composition comprising sheared paper (50% to 70% by weight) and polyethylene (30% to 50%). An example provided in this patent describes production of an 80 g batch of a compression-molded composite comprising HDPE (39%), sheared scrap newspapers or magazines (59%), and a coupling agent (Fusabond 100D, 2%).

U.S. Pat. No. 6,207,729 describes a similar thermoplastic composition comprising shredded and sheared cellulosic materials (33%-59% by weight) such as old newspapers, magazines, kenaf, kraftboard, etc., HDPE (33% to 50%), calcium carbonate (11% to 17%), and a coupling agent (Fusabond 100D, 2%).

U.S. Pat. No. 6,758,996 teaches that high levels of granulated papermill sludge (up to 70%-75%) can be mixed with synthetic plastics for extrusion or injection molding of a homogenous composite having high strength, high impact resistance, and low flammability for decking products. This art is designed as a homogenous structural material commercially used in extrusion of composite decking.

U.S. Patent Application Publication No. 2005/0241759 discloses a decorative laminate structure having at least two sheets of polycarbonate and at least one decorative image layer there-between two sheets of polycarbonate, and a method of making the decorative laminate structure. Through heat and pressure the sheet layers and the decorative image layer are bonded together resulting in a decorative laminate structure of this invention. This product is intended for use primarily to produce decorative articles which include counter tops, table tops, cabinet doors, game boards, toys, panels for shower stalls, hot tubs, markerboards, indoor and outdoor signs, seamless vanity tops including sink, soap dish, back splash, flooring and others U.S. Pat. No. 7,615,275 discloses a decorative architectural panel that can be formed using multiple image layers to create one or more three-dimensional effects in a final product. In particular, a reference image layer comprises an extruded sheet having an artistically-designed reference image formed thereon. A next image layer comprises an extruded sheet having a differently sized iteration of the artistically designed reference image. A manufacturer can place the next image layer over the reference image layer, and set the combined image layers such that the final product shows the artistically-designed image in three-dimensions. Additional image layers, such as a color layer, or a layer having embedded objects, can be combined with the stratified product for additional artistic effects. This patent is based on extruded sheet plastics that are laminated together to form a transparent panel with various inclusion pressed in between the transparent sheets. This art teaches that the sheets are fully melted.

Numerous patents have been filed using polylactic acid bioplastics for film and blow molding applications using extrusion processing including U.S. Pat. No. 7,297,394 disclosures using a biodegradable polymer blend for laminating coatings, wraps and other packaging materials. The films are designed for packaging applications wherein the PLA is heated to its crystalline processing temperature and above its melt temperature of 390 degrees F. to obtain optimal clarity.

Decorative solid surfacing materials have been used over the past decade for a myriad of applications including worksurfaces, countertops, architectural components, plaques, tiles, and wall systems all based on various form of hazardous petrochemically derived materials. Materials such as Corian, Avonite and other solid surface materials use forms of acrylic or polyesters in a liquid form with hazardous catalysts wherein decorative chunks of the same material is "floated" within the polymer matrix. These non-environmental materials do not fully have the aesthetics of natural granite due to the fact that particles are uniformly blended within the liquid polymer matrix. The uniformity of floating particles yields a man made and ordered aesthetic appearance.

Other materials have been developed using virgin or blends of recycled clear plastic wherein various inclusion are placed between sheets of these plastics and melted together to form decorative panels. These processes and products are very expensive typically selling for over $20 per square foot and typically are not 100% recycled materials. These materials are limited to long cycles to fully melt and cool the sheet materials into a homogenous sheet form. In addition these layered sheet are homogenous in optical properties.

Generally, the above discussed art is based on the melting of a liquid polymer in forms of virgin, recycled or biobased where the material is mixed and processed above its Tm melting point and to provide a well mixed homogenous material. This art is further based on mixing extrusion processes that requires the melting of the polymer portion to even flow through the machine.

Biolaminates

Biopolymer based biolaminates are environmentally friendly and petrochemical free and also have functional features including UV transparency and high degree of resistance to UV degradation. The highly polar nature of biopolymers provides a high degree of ability to load various levels of fillers or functional materials such as photocatalytic particles or nanoparticle or blends thereof. The UV transparency and resistance of UV degradation provides unique properties for photocatalytics in regards to having photocatalytic in thicker coatings that better accept UV wavelengths based on photocatalytic functionality.

Most current art that teaches about photocatalytics in combination with a binder used as coating state that only very thin layer of coating can be used because of the UV absorption of petrochemical based binders. The same limitation is considered present for petrochemical films wherein the photocatalytic can only be a very thin micro layer on the surface, for example see U.S. Patent Publication No. 2003/0165702.

SUMMARY

The present invention relates generally to biopolymers that may be used in optical applications. Suitable biopolymers include polylactic acid and polylactic acid blends. The polylactic acid may be used with a photocatalyst such as titonium dioxide in some embodiments. In other embodiments, the polylactic acid may incorporate decorative fused recycled particles. Generally, the biopolymer may be used in applications where optical characteristics and/or fire performance are desired.

A high surface energy material with low refractive index and UV transparency wherein multilayers of similar or dissimilar materials are thermally fused together to form various functional optical requirements is provided. Various compositions and systems are provided incorporating a UV transparent biopolymer structure. A photocatalytic biopolymer structure comprising of a UV transparent biopolymer integrating fused nanophotocatalytic minerals such as Tio2 is provided. Many embodiments are based on the integration of nanophotocatalytic minerals fused to a biopolymer structure in which the biopolymer structure is UV transparent (UVT) and allows UV light to be transmitted through the biopolymer structure activating the nanophotocatalytic fused layer. A UV transparent biolaminate either including a photocatalyst within the biolaminate material or as a coating over the biolaminate is provided.

DETAILED DESCRIPTION

Figure 1:
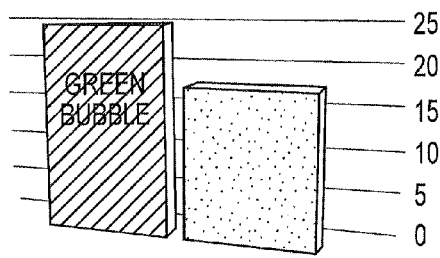
FIG. 1 illustrates biopolymer and acrylic limited oxygen index.

The present invention relates generally to biopolymers that may be used in optical applications. Suitable biopolymers include polylactic acid and polylactic acid blends. The polylactic acid may be used with a photocatalyst such as titonium dioxide in some embodiments. In other embodiments, the polylactic acid may incorporate decorative fused recycled particles. Generally, the biopolymer may be used in applications where optical characteristics and/or fire performance are desired.

A high surface energy material with low refractive index and UV transparency wherein multilayers of similar or dissimilar materials are thermally fused together to form various functional optical requirements is provided. Various compositions and systems are provided incorporating a UV transparent biopolymer structure. A photocatalytic biopolymer structure comprising of a UV transparent biopolymer integrating fused nanophotocatalytic minerals such as Tio2 is provided. Many embodiments are based on the integration of nanophotocatalytic minerals fused to a biopolymer structure in which the biopolymer structure is UV transparent (UVT) and allows UV light to be transmitted through the biopolymer structure activating the nanophotocatalytic fused layer. A UV transparent biolaminate either including a photocatalyst within the biolaminate material or as a coating over the biolaminate is provided.

In some embodiments, structures are provided that can be integrated into various products that are substantially 100% "natural" comprising of rapidly renewable biopolymers and natural nanominerals in addition provide an "active device" for the reduction or elimination of bacteria, viruses, VOC's and odor for a wide range of markets.

In some embodiments, an environmentally friendly lighting lens derived from renewable biopolymers is provided. The biopolymer provides a high limited oxygen index and other fire safety factors that are important for lighting products. The invention also provides a petrochemical free solution to hazardous petrochemical based plastics currently used in lighting lenses and diffuser ceiling light applications.

In some embodiments, a UV transparent biopolymer in the form of a fused particle sheet, extruded sheet, or molded structure wherein the biopolymer structure has fused nanophotocatalytic minerals one surface is provided. The other side of the structure can contain a UV light source such as a fluorescent tube, compact fluorescent light or UV LED in which the UV light is transmitted through the biopolymer structure and activate the nanophotocatalytic fused layer.

In some embodiments, a UV transparent stabilized biopolymer composition, having a high level of UV transmission and UV transmission retention, is provided. The composition is effective in retaining its UV transmission under various environmental conditions. By UV radiation, as used herein is meant radiation defined in UV-A, UV-B and UV-C spectra typically having a wavelength of 400 nm or shorter, or a light source that contains a certain portion of UV radiation that has a wavelength shorter than 380 nm.

In other embodiments, various forms of UV transparent biopolymer structures including independent fused particle sheets, extruded sheet and molded shapes are provided.

In yet other embodiments, the invention integrates UV sources from fluorescent lighting tubes, compact fluorescent lighting and UV LED sources. The invention further comprises structures such as fluorescent lighting diffusers and covers.

In still further embodiments, the invention further comprises the combination of a nanophotocatalytic layer in combination with a UV transparent device, structure, lighting covers and diffusers, panel, sheet or film.

The invention further comprises integration of these structures into various devices, products, and applications for reduction of VOCs, air exchanging, bacteria reduction, water purification and other applications. The invention can be used for a wide range of applications, products and devices for the reduction/elimination of bacteria, viruses, VOC's and odor in various markets.

In some embodiments, a photocatalytic biolaminate comprising a UV transparent biopolymer and TiO2 or nano TiO2 provided that may be used for architectural surfacing applications. The invention may be in the form of a solid film biolaminate that can be flat laminated or 3D laminated onto various substrates for interior or exterior applications.

In yet further embodiments, an aesthetic translucent composite that is derived from particle fusion technology and the usage of integrated bioplastic and/or recycled matrix plastics, and a method for making such composite, are provided. A process is provided wherein discrete particles are compression wave extruded wherein they can maintain individual boundary conditions and integrate a linear streaking effects by processing the recycled plastic between its thermal melting point (Tm) and its glass transition temperatures (Tg). The resultant panel has unique optical and aesthetic properties for translucent architectural panels with various transparent color effects and surface textures.

The teachings herein may be widely applied to a variety of fields. The teachings may be used to form films for UV sources, such reflective films including multilayer antireflective films for televisions or other screens and continuous/disperse phase reflective polarizers for screens. Embodiments disclosed herein, including the usage of PLA films of various thicknesses, have use in water treatment films, pipe, conduit and apparatus (UV), germicidal film, solar cell films, medical test containers, and UV photolithography.

Biopolymers

Biopolymer based biolaminates are environmentally friendly and petrochemical free, and also have useful functional features including UV transparency and high degree of resistance to UV degradation. Biopolymer biolaminates are highly polar nature and provide a high degree of ability to load various levels of fillers or functional materials such as photocatalytic particles or nanoparticle or blends thereof. The UV transparency and resistance of UV degradation provides useful properties for combination with photocatalytic materials such as nano Tio2 and other similar forms of nanophotocatalytic materials.

PLA has a higher specific gravity but a lower refractive index compared to polycarbonates.

| Specific Gravity | Refractive Index |
|---|---|
| Polycarbonate 1.2-1.22 | 1.58 |
| Polylactic Acid 1.24-1.25 | 1.46 note: Range with blending (1.4 to 1.55) |

Polylactic acid can be modified with biobased additives and petrochemical additives to "adjust" various functional and optical properties. Examples include, but are not limited to: acrylics, polycarbonates, silicon, fluorine based chemistry, standard petrochemical plastics, UV functional additives, nanomaterials and other such modifiers. The addition of small portions of these other additives or modifiers can be used to make adjustments in these various optical, electrical or functional properties.

Because of its UV transparency, PLA does not substantially degrade based on exposure to UV light or exterior sunlight containing UV spectra. Photo-degradation in plastics is caused by the UV component of solar radiation, that is radiation of wavelength from 0.295 to 0.400 nm. This is absorbed by some plastics and causes the breakage of bonds in the polymers leading to photo-oxidation. Because PLA is transparent at a broader range of UV wavelengths, PLA is not susceptable to molecular bond breakage leading to yellowing or photodegradation.

PLA has a low refractive index, a high specific gravity, UV transparency and low UV degradation. In addition the ability to modify PLA by means of processing or by compounding of additives gives functional PLA a broad range of application such as optical, electrical and functional applications.

Various waxes such as Carnuba wax are compatible with PLA and match refractive index. Carnuba wax has a refractive index of 1.45. Other material or waxes such as a soybean oil wax or "hydrogenated oil" based wax also provides a lower or matching refractive index.

PLA's current refractive index of 1.4 is within the upper range of the fluoropolymers. With "biomodification" and additives, PLA's refractive index may be manipulated within a similar range. PLA has a similar range of refractive index as fluoropolymers and is equal or better in UV transmission based on the PLA formulation or PLA composite makeup. Polylactic acid as a specific gravity typically around the 1.25 range and can produced in a transparent form. Common plastics for optical and other functional applications such as polycarbonate have specific gravities of typically 1.2 to 1.22 but are UV opaque.

Biopolymers have the ability to be "UV Transparent" at UV wavelengths primarily in the UV spectra and at the 388 nm at the primary wavelength of the TiO2 photocatalyst optimal performance range. The polar nature of a biolaminate, comprising a primary biopolymer allows the biolaminate to include other functional minerals such as natural quartz or other minerals that are also UV transparent. More specifically, the biopolymer structure can include fillers or additives that are also UV transparent as not to decrease the efficiency of UV transmission that drives the photocatalytic reaction. Fillers such as nanoquartz, fused silica, fluropolymers, or particles of fluropolymers and specialized acrylics can be blended with the biopolymer as long as they also have similar UV transparency characteristics as the UV transparent biopolymer.

While polylactic acid (PLA) is specifically discussed herein, other biopolymers having similar UV transparency, for example cellulose acetate, may alternatively be used.

Materials of low refractive index or UV transparent are typically expensive and difficult polymeric films. In many cases such as in fluorinated polymer used for AR, these polymers and the common addition of silicon reduces the surface energy of the film where adhesion to dissimilar material is difficult.

PLA also has a surface energy averaging about 40 DYNE and can be easily modified. This surface energy level is optimal for printing and adhesion while still providing a low refractive index and UV transparency.

PLA products as disclosed herein may be produced using 100% (or nearly 100%) rapidly renewable biopolymers that contain substantially no petrochemicals or hydrocarbon materials. This provides significant advantages as it relates to fire safety. Some measurements of fire safety are discussed below, including limited oxygen index (LOI), flame propagation and time to self-extinguish, smoke generation, and heat generation.

Limited Oxygen Index (LOI)—The LOI test measures the minimum percentage of oxygen in the atmosphere that is required to marginally support combustion. Since air is comprised of about 21 percent oxygen by volume, any material with an LOI of LESS than 21 will burn easier in air. Materials that rank in the 21 to 28 percent range are known as slow burning. Biopolymers used herein received a slow burning rating with a 24 to 26 percent measured LOI as tested per ASTM D2863. Thus from this data acrylic lighting lenses are considered a fire accelerator. The biopolymers discussed herein are classified as a slow burn with the ability not to support flame or fire in a standard oxygen environment. FIG. 1 illustrates biopolymer and acrylic limited oxygen index.

Figure 2:
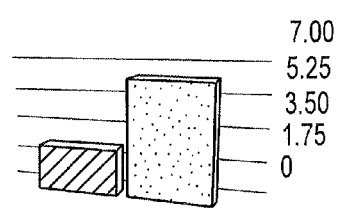
FIG. 2 illustrates biopolymer and acrylic ASTM 1354 cone calorimetry.

Flame Propagation and Time to Self Extinguish—Once ignition has occurred, the length of time over which flaming is maintained, and the speed with which flame propagation occurs in various geometries, are parameters of interest. Biopolymers as used herein self extinguish rapidly compared to petrochemical plastics used in current lighting systems. Time to self-extinguish tests are accomplished using Cone calorimeter in accordance with ASTM E1354. Data shows that PLA materials as disclosed herein self extinguish over twice as fast as conventional plastics used in lighting. FIG. 2 illustrates biopolymer and acrylic ASTM 1354 cone calorimetry.

Figure 3:
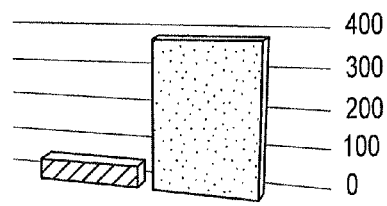
FIG. 3 illustrates biopolymer and acrylic smoke indices.

Smoke Generation—The amount of smoke generated by material during combustion is a critical flammability characteristic. ASTM E-1354, Cone calorimeter determines the amount of smoke released by the material upon ignition. Using Cone calorimeter, the visible smoke development and release can be measured in square meters of visible obscuration per kilogram burned (m2/kg). Biopolymers as disclosed herein do not burn "black" like petrochemicals and have very low levels of smoke release. (VTEC Labs, Oct. 23, 1998. Report #100-879-1,2,3). FIG. 3 illustrates biopolymer and acrylic smoke indices.

Figure 4:
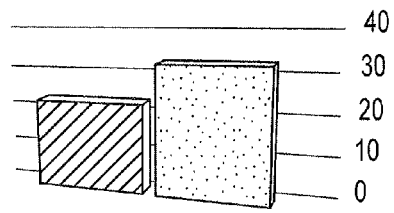
FIG. 4 illustrates biopolymer and acrylic heat generation.

Heat Generation—Peak heat release during combustion, measured in KW/m2, is an important measurement in assessing the fire development potential of materials and products. The lower then number of peak heat release measured in cone calorimeter combustion testing, the better the performance. Heat generation accelerates fires. Biopolymers as disclosed herein exhibit less heat generation than acrylics. FIG. 4 illustrates biopolymer and acrylic heat generation.

PLA Summary

Polylactic acid is a relatively high specific gravity as compared to common plastics and has a specific gravity closer to engineered plastics such as polycarbonate. Although similar in specific gravity to polycarbonate used in various functional and optical products, PLA has a much lower refractive index. In addition PLA is virtually transparent in UV wavelength spectrum as compared to polycarbonate and other common plastics that have very high UV absorption rates. From this PLA does not have visible or UV degradation or yellowing as founding common plastics.

PLA has a high surface energy that promotes the ability to coat the material with various optical coatings such as anti-reflective, photochromic, and other coating methods for optical materials and products. PLA surface energy is typically 40 Dyne and can be further modified by corona treatments and other means to change surface energy.

Spectrophotometry tests show that polylactic acid is UV transparent and provides additional optical properties in the visible and UV spectra. The ability to integrate UV transparent mineral, nanominerals and other UV transparent polymers provides the ability to create new materials, devices, and products that meet the need for UV transparency and provide an environmentally friendly solution. UV transparent biopolymers or biocomposites also can be molded, post-formed, or shaped into complex shapes.

In some embodiments, modifications to the refractive index of PLA are provided. Such modifications may be done using a wax, wherein the wax has a refractive index at or below 1.45. Alternatively, such modifications may be done using acrylates wherein the polymer blend can have a modified UV transparency and refractive index. To better match the refractive index of PLA, low Tg acrylics such as ethyl acrylate or butyl acrylate may be used.

PLA products as disclosed herein have significant fire safety advantages as compared to acrylics and other plastics typically used in lighting. These advantages include better limited oxygen index (LOI), flame propagation and time to self-extinguish, smoke generation, and heat generation.

Titanium Dioxide $TiO_2$, titanium dioxide, or titania, is the naturally occurring oxide of titanium and is known for the stability of its chemical structure, its biocompatibility and physical, optical and electrical properties. Titanium dioxide occurs in nature as the well-known naturally occurring minerals rutile, anatase and brookite. Zinc oxide and titanium dioxide, particularly in the anatase form, are photocatalysts under ultraviolet light. Titanium dioxide, when spiked with nitrogen ions, is also a photocatalyst under visible light. When titanium dioxide is irradiated with light, the light is absorbed by the oxide material and triggers a chemical reaction that, in the presence of water, ends with the oxidation of water to create hydroxyl radicals. The reaction can also produce oxygen radicals or oxidize organic materials directly. Moreover, free radicals actively modulate immune responses, activate macrophages and stimulate the healing process.

$TiO_2$ is a potent photocatalyst that can break down almost any organic compound when exposed to sunlight and be used for water and air treatment as well as for catalytic production of gases. The general scheme for the photocatalytic destruction of organics begins with its excitation by suprabandgap photons, and continues through redox reactions where OH radicals, formed on the photocatalyst surface, play a major role.

Photocatalysts

Photocatalysts, upon activation or exposure to sunlight, establish both oxidation and reduction sites. These sites are capable of preventing or inhibiting the growth of algae on the substrate or generating reactive species that inhibit the growth of algae on the substrate. In other embodiments, the sites generate reactive species that inhibit the growth of biota on the substrate. The sites themselves, or the reactive species generated by the sites, may also photooxidize other surface contaminants such as dirt or soot or pollen. Photocatalytic elements are also capable of generating reactive species which react with organic contaminants converting them to materials which volatilize or rinse away readily. Photocatalytic particles conventionally recognized by those skilled in the art are suitable for use with the present invention. Suitable photocatalysts include, but are not limited to, $TiO_2$, ZnO, $WO_3$, $SnO_2$, $CaTiO_3$, $Fe_2O_3$, $MoO_3$, $Nb_2O_5$, $Ti_xZr_{(1-x)}O_2$, SiC, $SrTiO_3$, CdS, GaP, InP, GaAs, $BaTiO_3$, $KNbO_3$, $Ta_2O_5$, $Bi_2O_3$, NiO, $Cu_2O$, $SiO_2$, $MoS_2$, InPb, $RuO_2$, $CeO_2$, $Ti(OH)_4$, combinations thereof, or inactive particles coated with a photocatalytic coating. In other embodiments, the photocatalytic particles are doped with, for example, carbon, nitrogen, sulfur, fluorine, and the like. In other embodiments, the dopant may be a metallic element such as Pt, Ag, or Cu. In some embodiments, the doping material may be used to modify the bandgap of the photocatalytic particle. In some embodiments, the transition metal oxide photocatalyst is nanocrystalline anatase $TiO_2$ Nanometer photocatalyst may be made from $TiO_2$ grains, the sizes of which are generally under 20 nm. After they absorb UV in sunshine and illuminate lamp-house, the electrons on the photocatalysts are activated by UV and produce electron holes, which have strong oxidation ability. The electrons have strong deoxidization ability and produce oxidation anion free radicals and oxyhydrogen free radicals after reacting with $H_2O$ and $O_2$ in air. They have strong oxidation ability, and can decompose the organic, contaminants, fume, and bacteria into hurtles $CO_2$ and $H_2O$.

Photocatalysts have strong efficacy in preventing mildew.

Photocatalyst Nano-$TiO_2$ been verified to kill bacteria, virus and fungi, as well as to eliminate foul smell. It has been tested with a series of experiences by different authorities and academic bodies, Food Research Center, Universities, etc, and having very good performance. Photocatalyst. Nano-$TiO_2$ can kill Pseudomonas aeruginosa, Influenza virus, MRSA, Tubercle Bacillus, etc. Photocatalyst Nano-$TiO_2$ also has been tested and can eliminate the toxic and carcinogen gases, such VOC and formaldehyde, etc.

The threshold wavelength for titanium dioxide photocatalyst is 388 nm. At wavelengths below that the outer valence electron in the $TiO_2$ molecule simply needs to absorb enough photons to have the energy to escape.

Photocatalytic minerals that are doped may also be used in accordance to the teachings herein. This may further increase the efficiencies of the devices and systems within this invention by increasing the light wavelength range from UV as to also include lower ends of the visible light spectra.

UV Transparent Composites

UV Transparent (UVT) biopolymer composites are provided herein. UVT biopolymer material may be blended with various fillers, fibers, minerals, additives, and polymer blends as long as they do not significantly limit the UV transparent function of the UVT biopolymer. These materials can modify the mechanical or physical performance of the final product or device for specific applications requirements.

Fillers such as quartz, ATH and other UVT minerals can be compounded with the UVT biopolymer to increase its stiffness and improve heat resistance while having minimal effect on the UVT properties.

Fiber reinforcement can also be integrated into the material including glass fibers, mineral fibers, certain natural fibers and other common forms of fiber reinforcement to improve the mechanical properties of the final shape, sheet or panel.

Other petrochemical polymer additives can also be added such as fluropolymers, and special acrylics that also have similar UVT properties.

Biobased Encapsulant for LEDs

Polylactic acid is a biobased polymer commonly used for disposable and biocompositable packaging. Polylactic acid films or molded shapes have the following features in regards to UV wavelength optics: lower refractive index, UV transparent (lower than PET, PC or epoxy, highly polar—ability to blend fillers and other additives, safe—non petrochemical and non hazardous, non yellowing and low degree of degradation from UV/visible spectra, and ability to process at lower temperatures than convention plastics. These properties of PLA have potential for usage as an encapsulant material or lensing materials for LEDs.

Optical properties to consider for encapsulants for LEDs include optical transmission in the UV-visible region (e.g. 99% @ 400-800 nM), high clarity (e.g. 95%), refractive index (e.g. 1.2 to 1.8), and transmission. Advantageous physical properties ideal for HB LED, in addition to their optical properties, include: a wide range of cured moduli from gels to hard resins, good adhesion between substrates and various components, a variety of cure chemistries for ease of processing such that an assembly may be offered in one part or two part compositions with reduced shrinkage, epoxies or silicon resin with refractive indices close to the GaN refractive index.

Degradation of intensity and color of a LED can occur when subjected to UV radiation. The LED encapsulate material is critical in reducing loss of light transmission (and hence a reduction in intensity) due to exposure to UV radiation. Consideration thus may be given to the type of encapsulate material, particularly for blue based in GaN LED technology utilized to produce white or other color with phosphor coatings. Careful selection of encapsulating material may be particularly useful in UV or near UV LEDs to try to prevent rapid degradation of intensity and color.

In accordance with the teachings herein, an encapsulant for LEDs is provided that comprises polylactic acid. In various embodiments, the PLA may be blended with additives, may be blended with silicon materials, may be in combination with nanomaterials (Ti02) for modification of refractive index, or may be blended with petrochemical polymers (PC, Acrylic, epoxies, etc). In some embodiments, the encapsulating material may be a UV transparent bio-encapsulating material.

High temperature, long-life, UV-tolerant encapsulants and packaging materials are thus provided.

A method of making a light emitting device is disclosed. The method includes providing a light emitting diode and forming an encapsulant in contact with the light emitting diode; wherein forming the encapsulant includes contacting the light emitting diode with a biobased composition consisting of a polylactic acid-containing resin. A further method and assembly for a light emitting device lensing system is provided wherein the lens system is molded from a polylactic acid.

Nano Particle for Higher Refractive Index

The teachings herein may be used to form high refractive index (RI) materials that may be used for applications that require optical clarity or that may be used as particulate fillers in a low refractive index matrix that are opaque or scatter light.

PLA has a lower refractive index than petrochemicals. Nanoparticles such as TiO2 may be incorporated into the PLA to create a higher refractive index or to design the refractive index. Typically high refractive index is defined as above 1.65. Many LEDs and display applications comprise of phosphors, e.g. YAG:Ce, that are embedded in a matrix. Typically these phosphors have a high refractive index (more than approximately 1.85) and are embedded in a matrix of refractive index below 1.6 such as silicone. The blue or UV light emitted from the semiconductor chip is converted to white light as it strikes these phosphor particles. The scattering of light caused by the mismatch between the phosphor and the matrix results in halos and reduces the color fidelity. In addition, semiconductors used to produce light for LEDs, are high in refractive index, and the light extraction efficiency from the semiconductor surface into the encapsulant is limited by the low refractive index of the encapsulant. Thus higher refractive index encapsulants are desirable. Higher refractive index materials are those which have an index equal to or higher than 1.65 in the wavelength of interest. The high index materials of this invention may also be used for other applications such as lenses, coatings, waveguides, optical fibers, etc. In this application high RI materials are desired that are clear or form clear composites.

The highly polar nature of the PLA also may have value and potential for compounding or coating of various phosphors coatings or refractive index modification materials.

In one approach the high refractive matrix comprises high index nano-particles that are pre-formed and are uniformly mixed (or reacted) with a resin material, so that it results in a refractive index of the matrix between the high index particles and the RI of the resin. Some examples of high, refractive index materials are metal oxides that contain one or more of the elements typically selected from Si, Ti, Zr, Al, Ta, Zn, Sn, Sb, Zr, Be, Ce, Pb, Ge, Bi Y, Gd and W. Silicon oxide by itself has low RI but can be combined with other materials to get high RI. For example, titanium dioxide may be modified with less than 10% of another oxide such as that of Si, Zr or Ta, etc., to reduce its photooxidation characteristics. The nanoparticles may provide other desirable properties, e.g., electrical conductivity (indium/tin oxide or zinc aluminum oxide or tin antimony oxide), thermal conductivity (e.g., aluminum oxide, aluminum nitride, beryllium oxide) and UV stability (e.g., cerium oxide, zinc oxide Preparation of Metal Oxide Nanoparticles and their surface modification (attachment of proper functional groups) is described in many publications (for example, see US Patent Application Publication 2008/0134939). Proper surface modification ensures that the nano-particles are well dispersed in the desired matrix material without aggregation or coagulation. In published US Patent Application Publication 2008/0134939, production of nanoparticles is done by carrying out hydrolysis and condensation of metal alkoxides under controlled conditions, and the surface modification with organic groups (e.g., hexoxy) providing amphiphilic properties so that the particles can be dispersed both in polar solvents such as water and non-polar organic solvents.

Increasing the refractive index of optical biopolymers dramatically impacts optical encapsulants. One application for optical encapsulants is high brightness light emitting diodes (HB LEDs). Within the embodiment of this disclosure, nanoparticles of Tio2 are integrated into the biopolymer. These nanoparticles do not scatter visible light. Tio2 are transparent to visible light and have a high refractive index (n=2.7). Other higher refractive index materials, for example oxides, may alternatively be used. Consideration in selecting a suitable high refractive index material include: refractive index at 450 nm—Copper Oxide 3.05, Aluminum Oxide 1.77, TiO2 2.48.

In other applications, high refractive index materials can be used in another way. Many applications requiring common plastics with low refractive index use large sized (average size greater than about 0.1 µm) high refractive index inorganic powders (typically titanium dioxide based materials) as fillers to provide opacity or hiding power. Titanium dioxide based fillers and pigments are available from many sources. Some of these are Tronox Inc (Oklahoma, Okla.), Tioxide pigments from Huntsman (Bellingham, UK) and Dupont Titanium Technologies (Wilmington, Del.). Applications include paints, packaging, fibers, instrument and appliance housings, and a variety of industrial and consumer goods. It is desirable that these fillers/pigments be replaced by other polymers or deformable materials of high refractive index. This allows rheological advantages of these polymer composites in terms of lowering the viscosity, reducing abrasion on processing equipment and while also allowing flexibility to control the shape of the dispersed phase to provide additional property advantages.

Methods of UV

Aliphatic polyester based resins such as polylactic acids do not contain aromatic rings in the molecular chains thereof and hence do not absorb ultraviolet rays. Therefore, reflection films made thereof do not deteriorate nor yellow, maintaining the reflectance of the film even after being irradiated with ultraviolet rays form the light source of the liquid crystal display and the like. Among aliphatic polyesters, polylactic acid-based resins with relatively small refractive index (less than 1.46) may be used.

Enhanced Fire Resistant, Environmentally Friendly Lighting Lens

An environmentally friendly lighting lens that provides lower refractive index and provides new levels of fire safety is herein disclosed. Low temperature processes and additives that allow lower cost and higher speed production of biobased lighting lenses are further disclosed. Such environmentally friendly, biobased lighting lens provides an alternative to acrylic and polystyrene lenses and diffusers currently used in commercial lighting lenses, diffusers and fixtures that has improved "non yellowing" function.

In one embodiment, a flat or 3D formed lighting lens or diffuser comprised of substantially 100% biopolymer (polylactic acid) that is extruded by means of lower temperature and with optional bioadditives which is then embossed for light diffusion is provided. The lower refractive index provides the ability to create unique embossed structures to optimize light dispersion patterns. The resultant lighting panel can be post formed into a 3D shape or retained in a flat panel that is replaces current drop ceiling commercial lighting lens and diffusers.

In another embodiment, a lighting lens that has exceptional non yellowing performance is provided. Common acrylic, although reasonably UV stable, will still yellow over time. In order to improve this, petrochemical additives are added to the acrylic. Polystyrene lenses yellow even faster than acrylic. These yellowing issues related to petrochemical are based on the petrochemical plastics molecular makeup and their nature to absorb UV spectra. Polylactic acid does not absorb UV spectra and is actually highly UV transparent in the UV A and UV B light spectra. Thus polylactic acid does not substantially yellow.

An environmentally friendly, fire safety lighting lens diffuser comprising polylactic acid is provided. In some embodiments, the polylactic acid may be extruded and/or embossed. In some embodiments, a natural wax or hydrogenated triglyceride additive may be added to the PLA. In some embodiments, the PLA light lens exhibits a higher limited oxygen index than acrylic, polycarbonate, and polystyrene. In some embodiments, the PLA light lens exhibits a lower refractive index than acrylic, polycarbonate, and polystyrene. In some embodiments, the PLA light lens exhibits a lower smoke index than acrylic, polycarbonate, and polystyrene. In some embodiments, the PLA light lens is self extinguishing. In some embodiments, the PLA light lens exhibits lower heat generation than acrylic, polycarbonate, and polystyrene. In some embodiments, the PLA light lens exhibits improved non yellowing characteristics compared to acrylic, polycarbonate or polystyrene.

A process of making a polylactic acid extruded lighting lens diffuser is provided and discussed in Methods of Making below. Generally, hydrogenated triglyceride or natural wax may be used as an additive to the PLA. Processing may be done at between approximately 320 and approximately 390° F. Chilled embossing rollers may be used to provide a lensing effect. Sheets of extruded PLA may be cut to size, such as into small lighting panels.

Photocatalytic Biolaminates

Generally, a photocatalytic biolaminate may be provided that can help deodorize, can prevent damage from moisture and smog, prevent and control growth of bacteria, germs, and mould, and can break down ethylene into carbon dioxide and water.

Biopolymers are "UV Transparent" at UV wavelengths primarily in the UV spectra and at the 388 nm at the primary wavelength of the TiO2 photocatalyst. This allows NanoTiO2 or a combination of NanoTio2 with larger particle of TiO2 to be within the bulk of the biolaminate. The polar nature of the biolaminate primary biopolymer also can include other functional minerals such as natural quartz or other minerals.

A resulting photocatalytic biolaminate can be formed onto flat substrates or 3D formed for worksurfaces, 3D wall systems, flooring, textured flooring and even exterior components. The lack of UV degradation and ability to add a non-hydrolyzing agent can make this into a good exterior environmentally friendly surfacing solution for exterior applications in addition to a myriad of interior surfacing applications.

Figure 5:
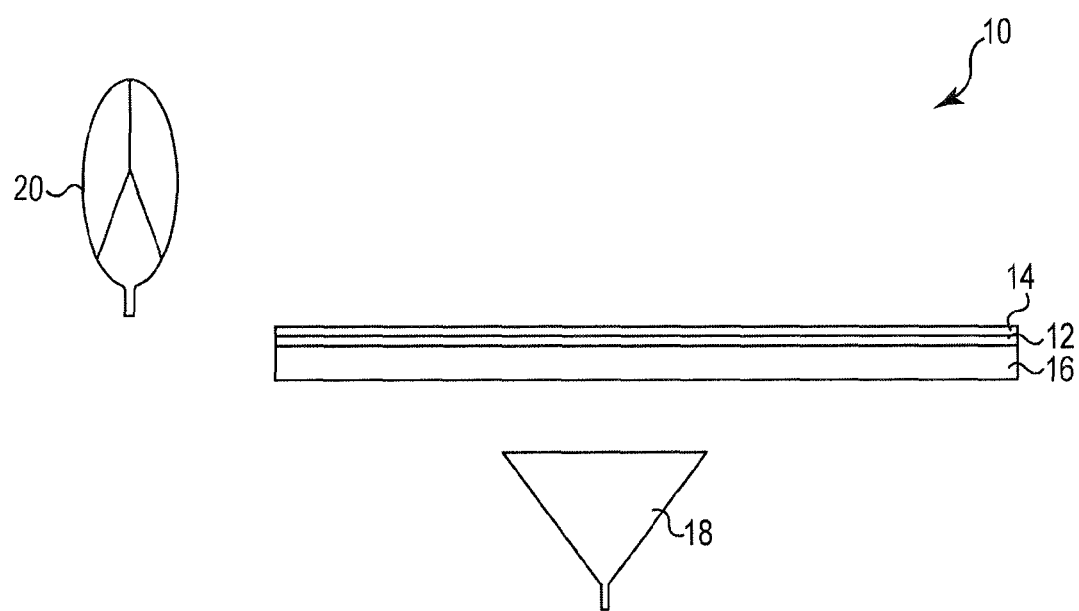
FIG. 5 illustrates an example photocatalytic biolaminate in accordance with one embodiment.

FIG. 5 illustrates an example photocatalytic biolamiante 10. The biolaminate may include a UVT biopolymer layer 12 and a nanophotocatalytic layer 14 in contact with the UVT biopolymer layer 12. The nanophotocatalytic layer 14 may be fused to the UVT biopolymer layer 14. The UVT biopolymer layer 14 may be provided over a substrate 16. The substrate may be UV transparent, such as glass. A fixed UV source 18 may be positioned such that light in a uv spectra from the UV source reaches the UV transparent biopolymer layer. UV spectra can be transmitted though the UVT biopolymer structure to activate the nanophotocatalytic layer. An air source 20 may be positioned to force air over the nanophotocatalytic layer 14.

There is a wide array of functional applications for photocatalyst nanotechnology based biolaminates including bacterial reduction, deodorizing effect, air purifying effect, self-cleaning, and water purification. Each of these is described in more detail below. It is to be appreciated that other functional applications exist and are not discussed here.

Bacterial Reduction—Titanium dioxide has strong oxidation effects on single-celled organisms including all bacteria and fungi. The very strong oxidizing power of titanium dioxide can destroy the bacteria's cell membrane, causing leakage of the cytoplasm, which inhibits bacterial activity and ultimately results in the death and decomposition of bacteria. Photocatalysts kill bacteria cells and also decompose the cell itself. The titanium dioxide photocatalyst has been found to be more effective than any other antibacterial agent, because the photocatalytic reaction works even when there are cells covering the surface and while the bacteria are actively propagating. The end toxin produced at the death of cell is expected to be decomposed by photocatalytic action. Titanium dioxide does not deteriorate substantially and shows a long-term bacteria reduction effect. Generally speaking, disinfection by titanium oxide is 3 times stronger than disinfection by chlorine, and 1.5 times stronger than disinfection by ozone.

Deodorizing Effect—The hydroxyl radicals accelerate the breakdown of any Volatile Organic Compounds or VOCs by destroying the molecular bonds. This helps combine the organic gases to form a single molecule that is not harmful to humans and enhances the air cleaning efficiency. Some of the examples of odor molecules are: Tobacco odor, formaldehyde, nitrogen dioxide, urine and fecal odor, gasoline, and many other hydro carbon molecules in the atmosphere. Air purifiers with TiO2 can prevent smoke and soil, pollen, bacteria, virus and harmful gas as well as seize the free bacteria in the air by filtering percentage of 99.9% with the help of the highly oxidizing effect of photocatalyst (TiO2). Deodorization can be by decomposing odor molecules caused by tobacco smoke, pets, chemicals, urine, fecal matter, etc.

Air Purifying Effect—The photocatalytic reactivity of titanium oxides can be applied to the reduction or elimination of polluted compounds in air such as NOx, cigarette smoke, as well as volatile compounds arising from various construction materials. Also, high photocatalytic reactivity can be applied to protect lamp-houses and walls in tunneling, as well as to prevent white tents from becoming sooty and dark. Atmospheric constituents such as chlorofluorocarbons (CFCs) and CFC substitutes, greenhouse gases, and nitrogenous and sulfurous compounds undergo photochemical reactions either directly or indirectly in the presence of sunlight. In a polluted area, these pollutants can eventually be removed.

Self-Cleaning—The hydrophilic nature of titanium dioxide, coupled with gravity, will enable dust particles to be swept away following rain or a water stream, thus making the surface self-cleaning. When the surface of photocatalytic film is exposed to light, the contact angle of the photocatalyst surface with water is reduced gradually. After enough exposure to light, the surface reaches super-hydrophilicity. This causes the surface to substantially not repel water; thus water cannot exist in the shape of a droplet and instead spreads flatly on the surface of the substrate. The water takes the form of a highly uniform thin film, which behaves optically like a clear sheet of glass. Most of the exterior walls of buildings become soiled from automotive exhaust fumes, which contain oily components. When the original building materials are coated with a photocatalyst, the dirt on the walls will wash away with rainfall, keeping the building exterior clean at all times. Most of the exterior walls of buildings become soiled from automotive exhaust fumes, which contain oily components. When the original building materials are coated with a photocatalyst, a protective film of titanium provides the self-cleaning building by creating bio-static (nothing will grow on it), super oxidative, and hydrophilic surfaces. The hydrocarbon from automotive exhaust is oxidized and the dirt on the walls washes away with rainfall, keeping the building exterior clean at all times.

Water Purification—Photocatalyst coupled with UV lights can oxidize organic pollutants into nontoxic materials, such as CO2 and water and can disinfect certain bacteria. This technology is effective at removing further hazardous organic compounds (TOCs) and at killing a variety of bacteria and some viruses in the secondary wastewater treatment. Photocatalytic detoxification systems can effectively kill fecal coli form bacteria in secondary wastewater treatment.

In use, a photocatalytic biolaminate may be provided over a structural layer. More specifically, the structural layer may be coated with a liquid or solid photocatalytic biolaminate. In one embodiment, the biolaminate may comprise a thin biolaminate film containing a photocatalytic that is first laminated onto a secondary plastic film to create a hybrid laminate The structural layer may be any layer, especially those used in construction. For example, the structural layer may be an interior or exterior construction surface. The structural layer may be horizontal, for example a floor, a walkway or a roof, or may be vertical, for example the walls of a building. For the purpose of the present application, the term "vertical" includes all non-zero slopes.

The material forming the structural layer may be internal or external. The structural layer may be porous or dense. Specific examples of structural layers include concrete, clay, ceramic (e.g. tiles), natural stone and other non-metals. Additional examples of the structural layer include roofs such as metal roofs, roofing granules, synthetic roofing materials (e.g. composite and polymeric tiles) and asphalt shingles. The structural layer may also be a wall.

The coatings of the invention provide long-term resistance to staining from bio-organisms or from airborne contaminants. In the presence of UV light, for example from sunshine, the photocatalytic titania in the coatings photo-oxidizes organic materials. For example, it oxidizes materials such as volatile organic compounds, soot, grease, and micro-organisms; all of which can cause unsightly discoloration.

The coatings of the invention also can "fix" or oxidize nitrogen oxides from the air and thus reduce the amount of one component responsible for poor outdoor air quality.

The coatings can also make surfaces easier to clean with water, as they oxidize the N, P, and S in compounds to soluble ions that can be washed away with rain or another water source.

During summer, the titanium crystals reflect sunlight to enhance cooling considerably.

In some embodiments, a photocatalytic biolaminate is provided over a substantially transparent substrate such as glass. A UV lighting source is provided to illuminate the substrate and as air mechanism such as a fan can be provided for displacing air over the photocatalytic biolaminate. When the UV lighting source is activated, the photocatalytic biolaminate undergoes a photocatalytic reaction and the resultant oxidation compounds are carried by the air mechanism.

A Decorative Fused Particle Translucent Composite Derived from Recycled Plastic

The teachings herein disclose a biocomposite particle and method of making that creates a unique geometry fused biocomposite particle sheet, colorization process and translucent composite with the ability to create minimum energy random fractal geometries to better simulate stone flow aesthetics and provide equivalent performance of petroleum based solid surfacing materials and lower cost alternative to current translucent architectural panels while providing an environmental alternative.

An aesthetic translucent composite that is derived from particle fusion technology and the usage of integrated bioplastic and/or recycled matrix plastics, and a method for making such composite, is provided. A panel formed with the translucent composite has unique optical and aesthetic properties for translucent architectural panels with various transparent color effects and surface textures. Various forms of aesthetic multicolored microparticles can be used within the biocomposite particle to create a wider range of aesthetics.

In the method of making, discrete particles are compression wave extruded wherein they can maintain individual boundary conditions and integrate a linear streaking effect by processing the recycled plastic between its thermal melting point (Tm) and its glass transition temperatures (Tg). Also disclosed herein is a colorization method for the discrete particles wherein the transparent recycled plastic is coated with a translucent and/or opaque paint and these discrete particles are elongated through this process creating and optical flowing 3D effects. Thermal fusion processing of these discrete particles is done without compounding or blending as done in normal plastic processing. This process provides a unique look wherein particles are elongated but retain a discrete nature and fuse together at a point below their melting point (Tg). Polymers or plastics including, but not limited to are compact disc waste, recycled polycarbonate, polylactic acid, and other clear or semitransparent recycled plastics.

A translucent discrete particle composite panel textured by a secondary pressing process to emboss optical or aesthetic textures into the surface of the resultant translucent panels is further provided. A three-dimensional aesthetic appearance similar to that of flowing natural granite patterns found in a random fractal geometry and a high depth of field is thus provided. The resultant panels are designed to provide architects with highly aesthetic translucent colorized panels wherein they can be used as dividers while still letting light pass through, but provide privacy and aesthetics. Applications include, but are not limited to, office dividers, hospital room dividers, light panels, backlight panels, wall panels, passage door panels, and other architectural applications where highly aesthetic and translucent panels are desired.

Any suitable recycled plastic may be used. Generally, the types of recycled plastics used can be broad in nature and also comprise of various blends of recycled plastics. Although many embodiments use transparent recycled plastics, blends of opaque of semitransparent plastics may also be used. Plastic include, but not limited are: polycarbonate, acrylics, ABS, PE, PP, PS, PET, and other common process plastics that can be sourced through industrial scrap or post-consumer sources. Specific examples of recycled plastic include compact disc waste and/or polylactic acid.

The selection of recycled plastic or blends of recycled plastic impacts the final look of the translucent fused composite panel. Although blends of opaque or colored mixed plastic can be integrated to provide streaking within a translucent fused panel, a majority of translucent plastic within the fused panel facilitates high light transmittance. Having a portion or all of the discrete particles be clear with a tint, colorized or clear coating enhances the discrete boundary conditions of each particle during the composite fusion process.

In some embodiments, a coating is provided merely by the selection of the recycled plastic. For example, in the usage of recycled compact discs, one side of the disc is metalized and the surface is a printed label while the majority of the balance is transparent. By grinding into random geometry particles, the metalized layer provides a discrete particle boundary, but still fuses to other plastic or coated transparent plastic particles. The fused particle composite panel and be 1% to 100% recycled CDs. More preferably the amount of CD in the fused particle composite is between 1% to 20% and typically a smaller size than the other coated discrete particles.

Recycled plastics typically come in a "regrind" form whereas molded parts, trimming, or scrap parts are ground using a knife grinder which creates a fractured non uniform particle similar to broken glass particles. Regrind materials such as compact disc waste or clear biopolymers are sorted by means of screening into various particle sizes.

Accordingly, in some embodiments, a decorative fused particle translucent composite can start with clear or transparent colors of polylactic acid in the form of regrind that provides for a clear inside of the biocomposite particle. The plastic particles may be compounded to contain various multicolored microparticles to create a semitransparent or light diffused medium to create individual particles. By blending various color, light diffusion characteristics, geometries, sizes, and other various optical property biocomposite particles together, once fused they have unique optical properties and translucence that provides a true depth of field in this biobased solid surface material. As in the value of natural granites in the market the higher the "depth" of the material or ability to see into the granite, the higher its value. Solid surfacing material typically does not have this type of depth of field or in using clear resins look unnatural as particles uniformly floating in a clear resin.

Natural granite comprises of a wide range of crystalline materials in various sizes, shapes and depth of fields to create the natural look of stone. Using standard "round" pellets produces a look that is more uniform that granite. By the using a regrind that is coated or compounded using multicolored microparticles, the regrind takes on a very different look. CD waste plastics, polylactic acid, polystyrene and most higher forms of recycled plastic are naturally brittle—plastic and shatters similar to that of glass in a concoidal fracture random geometry of various sizes. This creates a high degree of random shape and depth within the biocomposite as compared to uniform particles.

In some embodiments, a panel is provided that is translucent as to allow light to pass, but that is not optically clear such that some privacy is provided. In various blends of recycled plastic, mostly transparent particles such as recycled PC, PLA, PS and other clear random geometry particles may be blended. Within this blend, various opaque particles or opaque coated particles may be added (generally at levels less than approximately 50% of the total weight of the material). In processing between the TM and TG of the materials, optical discontinuities between the clear particles and "streaks" from the opaque colored particles arise. After the panel has been formed by means of pressing or by Ram Wave processing, a texture can be embossed to further create textures to diffuse light. The resultant panel has diffused light transmittance, but is diffused to the point where a person can not see through the panel.

The discrete particle fused composite can also include various semitransparent intralayers to provide additional aesthetic values. Also other dissimilar materials can be added between the transparent coated particles.

Printed films—Using a clear film such as PET, PLA, Mylar and other clear print media, and image can be digital printed to the clear film. The printed clear film is layered in the middle of layers of the transparent coated particles and fused together. The resultant fused particles are deformed into a sheet wherein the transparent printed film becomes virtually invisible to the eye and the printed image appears to be floating in the middle of the discrete transparent particles. Printed images can include abstract prints, natural materials such as vines or flowers, lettering for signage and awards and other forms of signage printing. In addition printing layers can be done using a semitransparent paper such as a rice paper or similar thin semitransparent paper as in interlayer.

Inclusions—Other materials or particles can be added to further enhance the look of the material or to solve various recycling material problems. Mixed plastics, glass, metals, organic materials, agricultural by products and other materials can be ground into similar sized particles and blended with the transparent coated particles. During the fusion process the transparent coated particles deform around the inclusions to form a solid fused composite material or panel.

Depending on the types of plastic particles used in the fused particle composite, in some cases the mechanical performance of the surface may not be sufficient for certain applications such as countertops where high heat resistance and higher mechanical performance maybe required. In this case the fused particle composite can be coated by means of a special film fused to the surface or a liquid coating.

The protective layer may be a bilayer film comprising a protective layer on top of a sheet layer. The protective layer is preferably selected from the UV-cured or electron-beam-cured crosslinked acrylic, vacuum-cured or UV-cured urethane, UV-cured or electron-beam-cured silicon with acrylic or heat cured urethane or plastisol. A layer of polyurethane may be applied over the exterior surface to provide abrasion resistance. Alternatively, a biaxially oriented polyethylene terephthalate, such as MYLAR®, or Teflon, such as TEDLAR®, both available from DuPont Chemical Company, may be laminated to the top surface of the first sheet as a protective layer. More preferably, the protective layer comprises a UV-cured or electron-beam-cured silicon to achieve glass appearance.

The protect film can also be comprises of various plastic or bioplastics including, but not limited to PE, PET, PS, PC, ABS, PVC, acrylic, Teflon, and other plastic films. The film can also comprise of a biopolymer including PLA, Cellulose acetate and other transparent or semitransparent biopolymer films. These films can also include a "clear mineral" such as fused or fumed silica, alumina oxides, and other transparent minerals to further improve the heat resistance and mechanical performance.

Methods of making decorative fused particle translucent composites are described below in the Methods of Making section.

Applications

PLA Films

A PLA film may be used as an anti-reflective film for screens, such as television screens, and provides an interface between current petrochemical screen films and air. In one embodiment, an assembly is provided wherein a low refractive index PLA is extruded into a film and used within a multilayer assembly for television screens. One application is related to that of continuous/disperse phase reflective polarizers used in LCD televisions that rely on the difference in refractive index between at least two materials, usually polymeric materials, to selectively reflect light of one polarization state while transmitting light in an orthogonal polarization state. In one embodiment, an assembly of a thin PLA film in combination with a optical grade plastic or glass wherein the refractive index of the PLA is lower and provides a AR coating is provided.

With the design considerations described in U.S. Pat. No. 5,882,774, one of ordinary skill will readily appreciate that a wide variety of materials can be used to form multilayer polymeric reflective mirror films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

Antireflective Coatings

An antireflective or anti-reflection (AR) coating is a type of optical coating applied to the surface of lenses and other optical devices to reduce reflection. This improves the efficiency of the system since less light is lost. In complex systems such as a telescope, the reduction in reflections also improves the contrast of the image by elimination of stray light. This is especially important in planetary astronomy. In other applications, the primary benefit is the elimination of the reflection itself, such as a coating on eyeglass lenses that makes the eyes of the wearer more visible to others, or a coating to reduce the glint from a covert viewer's binoculars or telescopic sight.

Many coatings consist of transparent thin film structures with alternating layers of contrasting refractive index. Layer thicknesses are chosen to produce destructive interference in the beams reflected from the interfaces, and constructive interference in the corresponding transmitted beams. This makes the structure's performance change with wavelength and incident angle, so that color effects often appear at oblique angles. A wavelength range must be specified when designing or ordering such coatings, but good performance can often be achieved for a relatively wide range of frequencies: usually a choice of IR, visible, or UV is offered The simplest interference AR coating consists of a single quarter-wave layer of transparent material whose refractive index is the square root of the substrate's refractive index; this, theoretically, gives zero reflectance at the center wavelength and decreased reflectance for wavelengths in a broad band around the center.

The most common type of optical glass is crown glass, which has an index of refraction of about 1.52. An optimum single layer coating would have to be made of a material with an index equal to about 1.23. Unfortunately, there is no material with such an index that has good physical properties for an optical coating. The closest 'good' materials available are magnesium fluoride, MgF2 (with an index of 1.38), and fluoropolymers (which can have indices as low as 1.30, but are more difficult to apply). MgF2, on a crown glass surface, and bare glass give reflectances of about 1% and 4%, respectively. MgF2 coatings perform much better on higher-index glasses, especially those with index of refraction close to 1.9. MgF2 coatings are commonly used because they are cheap, and when they are designed for a wavelength in the middle of the visible band they give reasonably good anti-reflection over the entire band Antireflective polymer films ("AR films"), or AR coatings, are becoming increasingly important in the display industry. New applications are being developed for low reflective films and other AR coatings applied to articles used in the computer, television, appliance, mobile phone, aerospace and automotive industries.

AR films are typically constructed by alternating high and low refractive index polymer layers in order to minimize the amount of light that is reflected. Desirable features in AR films for use on the substrate of the articles are the combination of a low percentage of reflected light (e.g. 1.5% or lower) and durability to scratches and abrasions. These features are obtained in AR constructions by maximizing the delta RI between the polymer layers while maintaining strong adhesion between the polymer layers.

The low refractive index polymer layers used in AR films are usually derived from fluorine containing polymers ("fluoropolymers" or "fluorinated polymers"), which have refractive indices that range from about 1.3 to 1.4. Fluoropolymers provide unique advantages over conventional hydrocarbon based materials in terms of high chemical inertness (in terms of acid and base resistance), dirt and stain resistance (due to low surface energy), low moisture absorption, and resistance to weather and solar conditions.

The refractive index of fluorinated polymer coating layers is dependent upon the volume percentage of fluorine contained within the layers. Increased fluorine content decreases the refractive index of the coating layers.

However, increasing the fluorine content also decreases the surface energy of the coating layers, which in turn reduces the interfacial adhesion of the fluoropolymer layer to the other polymer or substrate layers to which the layer is coupled.

Other materials investigated for use in low refractive index layers are silicone-containing polymeric materials. Silicone-containing polymeric materials have generally low refractive indices. Further, silicone-containing polymeric coating layers generally have higher surface energies than fluoropolymer-base layers, thus allowing the silicone-containing polymeric layer to more easily adhere to other layers, such as high refractive index layers, or substrates. This added adhesion improves scratch resistance in multilayer antireflection coatings. However, silicone-containing polymeric materials have a higher refractive index as compared with fluorine containing materials. Further, silicone-containing polymeric materials have a lower viscosity that leads to defects in ultra-thin coatings (less than about 100 nanometers).

Thus, it is highly desirable to form a low refractive index layer for an antireflection film having increased fluorine content, and hence lower refractive index, while improving interfacial adhesion to accompanying layers or substrates.

Accordingly, an antireflective coating using PLA as described herein may be used.

Optical Mirror Films

Multilayer optical mirror films as used in conjunction with the present invention exhibit relatively low absorption of incident light, as well as high reflectivity for off-axis as well as normal light rays. The unique properties and advantages of the multi-layer optical film provides an opportunity to design highly efficient backlight systems which exhibit low absorption losses when compared to known backlight systems. Exemplary multilayer optical mirror film of the present invention is described in U.S. Pat. No. 6,924,014, which is incorporated herein by reference. Exemplary multilayer optical mirror film includes a multilayer stack having alternating layers of at least two materials. At least one of the materials has the property of stress induced birefringence, such that the index of refraction (n) of the material is affected by the stretching process. The difference in refractive index at each boundary between layers will cause part of ray to be reflected. By stretching the multilayer stack over a range of uniaxial to biaxial orientation, a film is created with a range of reflectivities for differently oriented plane-polarized incident light. The multilayer stack can thus be made useful as a mirror. Multilayer optical films constructed accordingly exhibit a Brewster angle (the angle at which reflectance goes to zero for light incident at any of the layer interfaces) which is very large or is nonexistent. As a result, these polymeric multilayer stacks having high reflectivity for both s and p polarized light over a wide bandwidth, and over a wide range of angles, reflection can be achieved.

UVT PCO Coated Panel or Film

A UVT biopolymer can be extruded into the form of a sheet or film which then can be coated using various optical coating methods such as antireflective, photochomic, refective and other coatings commonly used in optical coatings. The photocatalytic materials can be either integrated into these coating layers or applied separately over the surface of the optical coatings. In one embodiment, an assembly wherein a UV Transparent PLA film is extruded into a film or tube used for germicidal UV apparatus is provided.

Lighting Diffuser

Commercial ceiling fluorescent lighting fixtures currently use plastic acrylic or polystyrene covers or diffuser panels to protect the bulb if broken and to disperse the light more uniformly within a room. Both acrylic and polystyrene are opaque or block UV spectra. The invention integrates a sheet or UVT embossed structure as a direct replacement for the diffuser. A nanophotocatalytic coating or fused layer of nanominerals are fused to one side of the structure. The UV source in the form of a fixed fluorescent, UV led or other UV lighting sources are on the alternate side allowing the UV spectra to be efficiently transmitted through the UVT structure activating the nanophotocatalytic layer. The resulting light panel can be installed in standard commercial ceiling fixtures for new or remodel construction and provide bacteria, virus, VOC and odor reduction for facilities.

A UVT PCO lighting diffuser comprises of a panel either extruded, molded or of fused particles into standard dropped ceiling lighting covers sizes. The panel is coated with a PCO layer and the panel can be reheated to fuse the nanoparticles onto the surface. The UVT panel can also include transparent colored particles for aesthetic and branding recognition. The panel can also include decorative inclusion including recycled glass, fibers and minerals as long as they do not significantly reduce the UV Transparent function of the panel. The UVT PCO lighting diffuser has various embossed or molded textures as to better improve the light diffusion.

VOC Exchanger Devices

The UVT panels coated with a nanophotocatalytic layer in which a UV light source passes through the UVT panel to activate the nanophotocatalytic layer can be designed in various air exchanger devices. Flat or molded UVT biopolymer panels are extruded, molded or postformed into panels that are placed inside of an air enclosure. Air is blown or pulled through the enclosure by means of a fan. A UV source is placed on the side or outside of the enclosures wherein UV light can penetrate into the enclosure. Multiple panels of the UVT biopolymer nanocoated panels line up as to allow linear laminar flow through the enclosure without restriction. The UV light from the side or outside of the enclosure penetrates to the first UVT PCO panel and UV light will continue to pass through reaching the next panel. This allow for a multiple panels to be stacked to increase surface area and efficiencies within the enclosure for the reduction of VOCs, bacteria and odor. The device can also include a filter mechanism.

This mechanism or device can be built as a stand alone VOC exchanger wherein it recycles the air within a room. This also can be designed to fit within exhaust pipes to remove VOC's prior to being emitted to the outside environment.

UVT PCO Window Film.

A thin film of a UVT biopolymer is extruded using standard film extrusion methods. Other UVT materials, fillers, additives, tints, colorants, plasticizers and processing aides can be added as long as they do not significantly reduce the UV transparent function of the film. After extrusion the film is coated with a PCO material layer and optionally reheated to fuse the nanoparticles of the PCO onto the UVT biopolymeric film. The film can also be secondary coated with various antireflective or optical coatings. The film also can comprise of an window adhesive layer for window film applications again as long as the adhesive has minimal effect on the UV transparency of the UVT biopolymer film.

UVT PCO Water Purification Device and Hydrogen Generation.

A UVT biopolymer tube shape structure can be made from extrusion or postforming. A PCO coating is fused to the inside of the tube and a UV source mounted on the outside of the tube. Water flowing through the tube is processed by means of the nanophotocatalytic and residual UV light spectra that also can act as a germicide. Modifications to this structure may also have applications for the generation of Hydrogen as a renewable fuel. The device would utilize both direct sunlight and a separate UV light source underneath the UVT/PCO biopolymer layer in which water can be stored and converted into hydrogen.

UVT PCO Molded Device

A UVT PCO molded device comprises of a injection molded UVT biopolymer wherein a UV or full spectra including UV source can be inserted into the middle or center of the molded device. A nanophotocatalytic layer is applied and fused to the outside surface of the molded device. The device can be used in various applications for clothing, shoes, textiles, water purification, and medical devices for the reduction of VOC, odor, bacteria and viruses.

UV Crosslinking Applications

The potential of "UV TRANSPARENT" has other potential applications in coatings wherein UV curing technology may have applications. One example would be wherein a molten PLA blended with a photoinitiator would be extruded and subjected to UV curing to obtain crosslinking.

Fluorescent Lighting

Fluorescent bulbs commonly used in drop ceiling lighting fixtures may be used to provide sufficient UV to activate the photocatalytic surface through a UV transparent structure or device surrounding the fluorescent bulb. A fluorescent lamp or fluorescent tube is a gas-discharge lamp that uses electricity to excite mercury vapor. The excited mercury atoms produce short-wave ultraviolet light that then causes a phosphor to fluoresce, producing visible light. A fluorescent lamp converts electrical power into useful light more efficiently than an incandescent lamp. While larger fluorescent lamps have been mostly used in commercial or institutional buildings, the compact fluorescent lamp is now available in the same popular sizes as incandescents and is used as an energy-saving alternative in homes. The phosphor fluoresce process is not 100% efficient and thus a percentage of UV light is emitted from common fluorescent tubes.

Fluorescent lighting typically coming in long tubes for ceiling commercial fixtures and in the form of compact fluorescent lighting as a direct replacement for incandescent bulbs. Depending on the various type, brand and phosphorous, the amount of residual UV emissions may change. A fixture including a photocatalytic biostructure may be provided for use with fluorescent bulbs.

UV and LED Sources

Other forms of UV sourcing can be used within this invention including UV LED. UV LED or Ultra violet light emitting diodes, are currently used in the printing industry, air filtration and other industrial areas. They provide a good UV source with minimal power input requirements. Applications within this invention may not require full spectrum lighting or visible light, thus UVLED generating a narrow UV light band spectra at or around the 388 nm wavelength would provide sufficient UV to activate the photocatalytic function of the fused nano material layer.

LED Drivers can be in the form of individual light components, sheet, or arrayed lenses. LEDS can be standard commercial LED, OLED, UV LED and blends thereof.

Other forms of integrated sources can include plasma induction, quantum dots, and other lighting source technology that provide the potential for a full spectrum of light.

Fixtures

In commercial lighting, fluorescent bulbs are required to be covered due to potential breakage of the bulbs. In addition these covers provide a light "diffusing" function to distribute the light more evenly throughout a room.

Currently plastic diffusers are used to disperse the light from tubes. Typically these plastics are made from acrylic or polystyrene. These types of petrochemical plastics block most all of the UV spectra. Biopolymers such as polylactic acid are not petrochemically derived and have a unique molecular structure that allows for the transmission of UV frequencies through the material.

In optics, a diffuser is any device that diffuses or spreads out or scatters light in some manner, to give soft light. Diffuse light can be easily obtained by making light to reflect diffusely from a white surface, while more compact optical diffusers may use translucent objects. Commercial lighting is commonly done in healthcare, institutional, and many commercial buildings through dropped ceiling lighting. Drop ceiling lighting comprises of a metal enclosure, ballast and fluorescent tube lighting. The lighting is covered with a petrochemical plastic diffuser.

UVT Biopolymer Structures

Extruded film or sheet structures—UVT (UV transparent) biopolymer structures can be extruded into sheet or film materials that can be embossed within the extrusion process. The UVT biopolymer is melt extruded by using a sheet die at various desired thicknesses typically ranging from 0.002" to 0.5" and more commonly from 0.010" to 0.125". The extruded sheets can also comprise UVT fillers, fibers, and additives that are also UV transparent, but provide additional mechanical or physical properties enhancements or provide additional processing aid. The extruded sheet may then be coated.

Particle Fusion—UVT Particle Fusion structures may be comprised of polylactic acid or other UV transparent biopolymer pellets wherein the pellets are formed into a layer in a mold and heated to a temperature between its melting point and its glass transition temperature. This allows the pellets to form into individual spheres, fuse together, but still maintain distinct boundary conditions. This allows the ability for unique light diffusion. The individual particles can also be coated with a transparent paint, dye of colorant and blended with various colors or clear particles as to provide a unique aesthetic design for particle fused UVT structures.

Injection or continuous shapes—Polylactic acid or other UVT biopolymers can typically be injection molded into complex 3D shapes using standard injection molding processes. UVT biopolymer molded structures can be designed into various products wherein a UV source is inside of the structure and the nanophotocatalytic layer is outside of the structure allowing UV transmission as to activate the photocatalytic function of the device.

Rotational Molded—Polylactic acid or other UVT biopolymers can be processed into a powder or fine grind and molded into a hollow shape by means of standard rotational molding. An metal mold is rotated under sufficient heat conditions as to melt the powder and coat the mold walls. Once cooled the hollow structure can be coated with the nanophotocatalytic material.

These UVT biopolymer structures are all UV transparent and can comprise other UVT materials, fillers, polymers, and fibers as to provide a core structure for nanophotocatalytic mineral fusion on their surfaces and allowing UV transmission through the structure from a fixed and/or constant UV source.

Biobased Encapsulant for LEDs

Signage—Using combinations of phosphor, excited by blue or UV LED chips, LEDs may be used to replace neon tubes in the sign industry. Generally, UV LED chips are preferred over blue chips for the production of white light to enable other colors to be produced by changing the phosphor material type.

Railway lighting—Degradation of LEDs is a great concern when utilization of road traffic and railway signals. A minimum level of intensity must be maintained to enable the signal to be identifiable at the prescribed distance. Degradation of intensity of LED is a known phenomenon which is allowed for specifying a lifetime. Degradation of intensity and color of an LED can occur when subjected to radiation. The LED encapsulate material is critical in reducing loss of light transmission due to exposure to UV radiation.

Photocatalytic Biolaminates

One embodiment is the combination of PLA with a photocatalytic for biolaminate applications, the biolaminate may include, but is not limited to various functional additives, fillers, minerals, crosslinkers, and other common additives and fillers. A UV Transparent biolaminate either including a photocatalytic within the biolaminate material or as a coating of photocatalytic with various binders are included within the scope of this invention. In various embodiments, the photocatalytic biolaminate may comprise a polylactic acid in combination with photocatalytic particles, a photocatalytic surface coating, a quartz filled polylactic acid, modified polylactic acid, a decorative laminate, a coarse $TiO_2$ laminate, a polylactic acid liquid biolaminate comprising a UV cured PLA/acrylic in combination with photocatalytic particles and optional fillers, or other. In some embodiments, the biolaminate may be flat or may be 3D laminated onto a non-plastic substrate.

Suitable photocatalytic particles include: $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, NiO, $Cu_2O$, $SiO_2$, $MoS_2$, InPb, $RuO_2$, $CeO_2$, $Ti(OH)_4$, and combinations thereof.

Substrates may include but are not limited to: non plastic rigid substrates, wood, composites, cement fiberboard, roofing shingles, gypsum, wood composites, agrifiber composites, etc.

Applications for a photocatalytic biolaminate include, but are not limited to, laminated flooring, countertops, tables, food service surfaces, healthcare surfaces, worksurfaces, wall covering, solid flooring, lighting enclosures or lenses, and exterior: walls, roofing, trim, composite decking capstock, decking.

Decorative Fused Particle Translucent Composite

Applications for decorative fused particle translucent composites can include kitchen or commercial countertops, worksurfaces, flooring, wall tiles, plaques, awards, and other commercial applications can use the materials from this invention as a direct replacement for solid surfacing or other forms of decorative material applications. In addition due to the high degree of UV stability of the PLA, exterior applications such as signage, architectural panels, tables, and other applications are viable.

Methods of Making

Embodiments Comprising PLA and $TiO_2$

PLA Processing

Blend of fluoropolymer powders with a PLA film—The blending of fine particles of fluoropolymers can act as a suspension filler with PLA extrusion in combination with the viscoelastic extrusion process for films. Generally, processing may be at temperatures sufficient to flow the PLA, but not the fluoropolymer. The film can be post treated to increase the amorphous level and clarity of the final film product. The resulting film "may" have a lower refractive index based on the blend levels of the materials. Other "high melting point" polymers can be processed into fine or nano particles that also can be processed in the same manner.

In some embodiments, various natural waxes or oils may be compounded to modify refractive index and UV filtering or transparency function.

Nano Grinding and Spraying $TiO_2$ is ground into a nanosized particles and suspended in a water emulsion which can be sprayed into the surface of the UVT structures.

Fusion of Nanominerals to UVT Biopolymer Structure

The UVT Structure in the form of an extruded sheet, fused particle sheet, or molded form is preheated to a specific temperature below the melting point of the UVT biopolymer, but above the glass transition of the biopolymer. The nanomineral water emulsion is sprayed onto the surface and can be reheated to drive off residual moisture. The highly polar surface of the UVT biopolymer structure in combination with the heating provides for a firm fusion of the nanoparticles onto the active surface. The final nanocoated is heated below the melting point of the UVT biopolymer structure to assist fusing the nanoparticles onto the surface.

A lighting diffuser can be produced by extrusion method or embossing a prismatic pattern into the extruded biopolymer sheet. An alternative method is wherein pellets of UV transparent biopolymer are placed into a sheet mold or on a continuous belt and placed in an oven. The pellets are heated to a point below the melting point, but above its Tg point wherein the pellets soften and form into spherical shapes. The shapes fuse together into a sold material, but maintain independent boundaries for each spherical pellet. While still at a relatively hot condition, nanominerals can be sprayed or coated onto the surface of the UV transparent fused panel.

A second method of applying the PCO coating to the UVT Biopolymer is wherein a UV transparent carrier liquid is added to the nanominerals and directly applied to the UVT structure. In this form of coating a alkali metal silicate can be used. The coating composition of the present invention generally includes a dispersion of photocatalysts having a mean cluster size of less than about 300 nm and an alkali metal silicate binder. The dispersion can be made by mixing the photocatalysts, a dispersant and a solvent. Preferably, the photocatalysts are transition metal oxides. Particularly preferred photocatalysts include crystalline anatase $TiO_2$, crystalline rutile $TiO_2$, crystalline ZnO and combinations thereof. The coating composition has a solid weight percentage of photocatalysts in the range of about 0.1% to about 90%. Preferred weight percentage is in the range of about 30% to about 80%. Examples of suitable dispersants include inorganic acids, inorganic bases, organic acids, organic bases, anhydrous or hydrated organic acid salts and combinations thereof. Suitable solvents can be any solvents that dissolve the dispersant used. Examples of suitable alkali metal silicate binders include lithium silicate, sodium silicate, potassium silicate, and combinations thereof. Applying the coating composition onto a base article, followed by heating to elevated temperatures in a oven or other suitable apparatus, produces a photocatalytic coating with improved transparency that exhibits desirable photoactivity.

Embodiments Comprising Enhanced Fire Resistant, Environmentally Friendly Lighting Lense PLA is typically extruded at high temperature (380 F to over 420 F). PLA under this condition is typically sticky and is subject to hydrolization. Hydrolization can negatively effect PLA viscosity, which is important during extrusion processing. Accordingly PLA pellets are placed into an extruder running at an average temperature of 350 F. Additives such as an hydrogenated triglercides such as soywax can be added that reduces the natural stickiness of the PLA and reduces the hydrolysis of the PLA during extrusion. This allows the ability to have improved embossing for larger embossed textures required for lighting lenses. The extruded sheet may then run through chilled embossing rollers to create the final lensing shape and ran down a conveyer to complete the final cooling process. The continuous panels are cut to size. For example, the panels may be cut into specific 2 foot by 4 foot or 2 foot by 2 foot standard panel sizes.

Embodiments Comprising Decorative Fused Particle Translucent Composite

The method for making decorative fused particle translucent composites is based on Ryan Riebel's Intel International Science Fair Project in (2000) that took CD (compact disc) waste and molded the waste into a shape while maintaining discrete particles. The composite involved grinding recycled compact discs and thermally pressing the ground material into a solid composite.

The methods herein disclosed uses a novel ram wave extrusion or pressing method described within this invention as to soften and fuse the material without melting and mixing the particles to maintain a discrete particle boundary nature. Accordingly, the methods herein move away from the common processes of running materials through a mixing extruder or in a molten state. In one embodiment of the method, processing is done above the Tg and below the Tm points of the recycled plastic material under heat and pressure without mixing and within the ram wave process wherein the discrete particle fuse together and maintain their boundary conditions. These random fractal geometry boundaries provide unique optical diffusion and also allow for multicolored coated transparent particles to be blended together but maintain individual particle in this fused composite matrix.

The resultant material has unique discrete particle boundaries similar to that of natural stone or natural flowing patterned stone whereas different forms of rock particles are fused under great heat and pressure into a mass, but maintain the individual particles in a random fractal geometry that make granite or flowing granite look natural rather than manmade.

To form the decorative fused particle translucent composite, scrap plastic material is first ground by means of suitable plastic grinding equipment into a range of sizes. The grinding process creates fractured particles with unique geometries as compared to uniform pellets. Random geometries of recycled waste can provide desirable aesthetics. Some plastics such as compact disc waste and polylactic acid bottle waste already comes in a regrind format with a broad particle size and geometry.

The particles may be screened into various sizes, for example by means of a vibratory screener system. Particle sizes can range from 0.5" to less than 0.010", or in a mesh size range from 4 mesh to 50 mesh. In the final product uniform particle sizes provide more distinct particle boundary conditions wherein a blend provides a different optical and three dimensional look with more boundary conditions.

A unique lighting panel can also be made wherein the clear or semitransparent plastic (petrochemical, bioplastic or blends thereof) are heated in a mold or pan wherein the material is softened but not fully melted as to retain individual boundaries of the particles, but fuse the individual pieces together into a light panel.

In some embodiments, the recycled plastic particles may be coated. Coating of the transparent recycled plastic particles provides a sharper boundary condition during the time the material is deforming into a solid. Any coating means may be used. In one embodiment, the recycled plastic is spray coated using a transparent color, tint or dye based paint on the outside of each particle. The dissimilar nature of the paint chemistry further assists in maintaining discrete boundary conditions in the final processing into a sheet to more closely approximate a natural random fractal geometry similar to that of granite. The coating also has a different Tm or Tg point where when the particles are placed under heat and pressure in a non mixing flowing state the clear plastic particles will deform, but the coating will not soften. As these particles are reformed with minimal to no mixing, the coatings are allowed to "crack". The elongated coated particles have very unique aesthetics wherein we can see both the surface coating of the particles, but also can see through the cracked particles to the other side. This effect creates a deep three dimensional look. Typical coatings can be automotive paints, hobby paints, plastic dyes, tints and other forms of colorant systems.

Various sized particles are coated using a wide range of paints from transparent paints to metallic paints. These separate colored particles can be blended together to form an unlimited design ability by color, size, paint type and processing parameters.

The coating also provides for surface that better holds the PLA into a form while deforming. Various coatings also effect the deformation due to its melting point, glass transition point, thermoset or thermoplastic nature, thermal conductivity and other factors. These factors can affect both the aesthetic values and provide differing mechanical or surface properties required for various applications.

Decorative particles can be produced by two primary methods that can create a myriad of aesthetic and geometric particle forms. In the coating process method, various forms of sprayable paint may be used to coat the outside of these particles. Particles can be separated prior to painting by size using standard screening methods. Each size particle groups can be painted a unique color, then all sizes and colors can be reblended into the biocomposite particle admixture.

Compounding or reprocessing the recycled plastic process can also be used with these recycled particles wherein various decorative or functional fillers can be used to compound in the transparent particle. In one method paper millsludge, wood, agricultural fiber or cellulosic fiber can be dyed or coated separately. The colored cellulosic filler is then compounded with the clear plastic using minimal shear processing as not to reduce the size of the filler or fibrous colored material. The extrusion can then be ground using knife grinding or knife cutting methods to create random shaped and sized particles. These particles can then be blended with other coated particles to create unique aesthetics.

Another form of decorative and functional fillers can be a mineral. Minerals such as calcium carbonate, aluminum trihydrate, mag hydrox, silca, oxides, and other minerals can be used in their natural color, dyed, or colored. These colored minerals can be compounded in the clear plastic and again produced into random fractal geometry biocomopsite particles. Multiple colors of these compounded fused composite particles can be dry blended into the composite admixture to forms a wide range of color and patterns.

With the addition of fillers, fibers, or minerals some degree of drying may be done prior to the particle fusion process. Preferably less than 5% and more preferably less than 0.1%. The overall random geometry biocomposite particle can optionally contain multicolored micro particles that are less than 50% of the size of the biocomposite particle at levels wherein the microparticles provide for aesthetic three dimensional optical characteristics of the biocomposite particle. The clear plastic provides the depth of field wherein the colored microparticles provide color and random three-dimensional patterns within each particle.

While compounding and extruding the biocomposite particles derived from colored smaller particles and the clear plastic matrix resin, the final extruded compounded shape can be in the form of a rod or flat bar. Thus when grinding these forms of shapes in a knife mill, a wider range of random biocomposite particle shapes and sizes is achieved.

Particles can be produced and screened into various mesh size particles typically ranging from ¼" to less than 0.050". The micro particles within the biocomposite particle can be in a range from ⅛" to less than 0.020" based on the optical property required for specific biocomposite particles. By fusing various sizes, colors and geometries of the biocomposite particles into sheet or three dimensional forms we can create a truly three dimensional appearing solid surface with a pattern closer to real granite while providing true performance of solid surfacing materials.

The individual biocomposite particles can be designed using a wide range of various fillers, fibers, decorative materials, colorants, and other forms of smaller particles within the biocomposite matrix. This creates individual particles with a three-dimensional or depth of field look. Typically it is preferred that these biocomposite particles are not in a uniform shape or have geometries similar to fractured glass or concoidal fracturing.

Another method for creating the semitransparent random geometry particles is to reprocess the particles and mix various aesthetic and functional materials into the clear plastics at small ratios allowing translucency, but provide unique diffusion or aesthetic inclusion within individual particles. Again a blend of these particles can be added with clear plastic regrind, CD waste, and other colorized particles to create a myriad of looks.

Within the biocomposite particle matrix the coated particles may have clear or semitransparent insides. To create a semitransparent inside various cellulosic or mineral microparticles are used wherein the depth of field is changed, but still has a depth of field. Such material as colored fibers, minerals, fillers glitter, and other decorative inclusion maybe added to enhance specific particle looks.

The coating of the PLA also provides other unique characteristics of the final fused composite material. Coating processes create a biocomposite that has a clear recycled plastic inside and a coating of a different material on the outside. This bi-material coated plastic has unique thermal property and provides unique aesthetic potentials. Coatings are used primarily for color and to better maintain boundary conditions during thermal fusion processing. These coatings can also include fire retardants, fibers, minerals, fillers, metal, and other additives for aesthetic or performance requirements of the final fused particle biocomposite sheet or shaped product. These coatings can be either tined, transparent colors, opaque colors, metallic colors and other blends thereof.

After the particles are thermal fused the surface of the fused composite can be sanded. This removes the coating on the top layer of biocomposite particles fused in the solid matrix. This then shows the inside of the coated clear particles, thereby creating a higher depth of field within the decorative composite. Most commonly the coating will not stretch or compress during particle deformation in its elastomeric state. This creates cracks and buckling of the coating which creates unique aesthetic patterning in the coatings and final sheet biocomposite.

EXAMPLE

The clear plastic fractured random geometry particles are painted using metallic paint. The particles are fused in a mold at a heat below that of the PLA melting point wherein the particles become elastomeric and deform due to the materials low heat deflection point. The material is cooled. Initially the painted surface of the particles that deformed on the surface is observed and the material is mostly opaque in nature. By sanding or removing the surface layer at least the layer of the coating, the clear particles are opened up and only the backside of the particles and the paint/clear plastic particle interface are visible. By polishing the surface the material becomes very clear and the backside of each individual coated clear particle becomes visible. This provides a very unique optical property as compared to other forms of solid surfacing materials with a very good depth of field. By having random geometries within the clear-coated particle matrix, various angles of reflections within each particle by their unique geometry may be observed. Thus every particle provides a unique optical property.

Taking the forms transparent recycled particles in various geometries, sizes, and coated colors, the admixture is blended. The admixture can be molded. The fused composite panel can be formed into various shaped products for architectural applications including, but not limited to sinks, sculpted wall panels, formed store fixtures and other 3D shaped articles. Any suitable molding technique may be used including flat molding with optional post forming or direct molding.

To form a composite sheet, the admixture is placed in a flat mold. The material is then placed in an oven at a temperature below or near the melting point of the plastic. At this temperature the material is well above its heat deflection temperature and will easily deform but not so hot where the material melts. Although hot processing processes can be employed within this invention, simple gravity may be used to deform the particles at a very specific heat wherein the particles will soften, but not melt and form to its minimum energy state. This also requires significantly lower capital investment costs.

The processing temperatures is below the melting point Tm of the biopolymer. PLA is recommended by its manufacture to be processed above 390 degrees F. At this temperature the material is too viscous to maintain individual particle domains. The process described herein operates based on the heat deflection temperature range where particles soften to an elastomeric state that allows deformation to a minimum energy state without melt flow that would interferes with particle boundaries. Typically in the case of coated PLA or PLA based composite particles, temperature ranges from just under 200 degree F. to 350 degrees F. may be used.

The material is heated until all biocomposite particles fuse together. Being that coated particles and the colorant can typically contain various adhesive modifiers, the particles fuse together forming distinct boundaries at the particle interface. If the material is melted, these boundary conditions can be mixed and lose the geometry that creates the highly aesthetic value.

The mold is pulled from the oven and cooled at a slow rate. The material is removed from the mold for processing. Sheet materials can be from 1/8" veneers to thick solid surfaces over 1" in thickness. In addition molds can be of various shapes to form unique end products. Round molds can be created with various edge designs build into the mold in which the biocomposites particles are fused creating a unique solid surface table without the time and cost of machining and using low cost mold technology. Normally to create various shapes and three-dimensional edges, injection-molding processes are required which tooling and equipment is very expensive. This invention uses simple gravity for forming thus only requiring simple low cost molds to create these shapes.

A protective film can be layed into the pan or mold then coated discrete particles are placed over the top of the film. During the fusion process the protective film stays in tack while the particles deformed. The resultant material has the film directly fused onto the particle surface with no discontinuities.

Various other three dimensional molds can be created to form other forms of end products that are decorative, three dimensional in appearance and environmentally friendly. A sheet product ranging from a thin veneer to a solid surface over 1" is used for a wide range of architectural applications. Most commonly 1/2" sheets are used as in today's solid surfacing markets.

Direct molding may be done using, for example, a metal mold with a bottom and top surface cavity wherein the coated transparent particles are placed into the mold. Shapes can be molded using the biocomposite particles by using inexpensive shaped metal mold being the process does not require pressure to provide the shape. The mold has sufficient overflow as to have sufficient material to fill the mold and displace the air between the particles. Composite particles are placed into a two-sided mold with excess material in a sprue to feed in additional material as the air voids are reduced in the fusion process. In molding cases such as a sink where larger molding shapes are required, smaller sized biocomposite particles provides for higher bulk density of the biocomposite particles thus providing less flow markets to maintain the granite like appearance. The mold is placed into a oven and is placed under slight pressure. The coated transparent particle deform and fused into the final shape. The mold is cooled and the part removed.

Sheet biocomposites can be reheated and post formed into various shapes for applications such as sinks and other three-dimensional post formed products. Normal vacuum forming or simple heating the sheet then placing on a mold can accomplish this process. Generally, the sheet of the fused particle composite is then postformed over a mold by means of heating, pressure and/or vacuum to form the final shape. Processing such as thermoforming, vacuum forming and other common methods for plastic forming are commonly known.

After a panel has been pressed or Ram Wave formed into a sheet or strips, the sheets or strips can be placed into a heat platen press with a metal or textured foil/paper and pressed to emboss the surface of the translucent panel. Embossed textures can be used for both aesthetics or for diffusion of light. In some cases in backlight applications, the embossed pattern can be used to direct backlighting.

Another option for post embossing processing is that strips of various fused particle composite can be laid individually next to each other and the heat and pressure fuses the strips together. Thus various striping patterns can be developed to expand the aesthetic nature of this translucent architectural panel product.

As part of the particle fusion process, pellets of plastic or bioplastic can be fused together between their Tg and Tm points and form into spherical shapes providing a "bubble surface". In addition this also create a novel light diffusion function wherein the backside of the panel conforms to a flat surface of the mold and the top uncovered surface has unique texture similar to bubbles. During this process and heat condition the pellets within the open mold soften to their minimum energy spherical shapes. During this process they retain this general shape, but slightly deform so as to fuse the individual spherical pellets together into a solid sheet. The surface shows the independent spheres, but also have distinct boundaries. Together this geometry has novel optical diffusion properties that can be used in various backlighting applications.

Process I

Although standard extrusion or compression molding processes can be used to produce a translucent discrete particle composite, the preferred method is thermal molding wherein a metal or high temperature plastic mold is filled or layered with the various discrete particles.

The target heat is typically set between the average Tm and Tg points of the primary coated or uncoated plastics. In blends of PLA and Recycled CD (polycarbonate) the optimal processing temperature is 350 F which is below the melting point of the polycarbonate, but above its glass transition point so that these particles deform. At this temperature we are slightly above the melting point of the PLA which then flows within the material. Inclusion such as glass within this matrix are static in which the deformed polycarbonate and more flowing PLA will fully encapsulate, but slowly as to allow the removal of air bubbles.

For polylactic acid particles this range is from 200 to 320 degrees F. For compact disc waste this is between 250 to 400 F. The translucent paints that coats each particle does not have a specific melting point or at least a much higher melting point than the softening point of the clear plastic. In this process the particles are softened and deformed. In the forming mold the particles are elongated. In this case the coating shows cracking and elongation, but differently than the particle itself. This provides a very unique optical effect. IN the case of the compact disc waste the metallization layer is fractured as the plastic is elongated providing microchips of metallization layer in a linear pattern or "cracked pattern".

The molds can be made of various metals, high temperature plastics or composites that are placed in an oven. The mold shapes can be in the form of a slab sheet or complex 3D shape such as a sink, furniture component, countertop, worksurface or molded table top. The mold loaded with material is placed into an oven for about 1 hour depending on loading amounts, thermal transfer of the mold and temperature. After the material is fused in the oven, the material is removed for slow cooling and mold release.

Slabs are then placed in a hot platen press at lower pressure (ranging from 5 psi to 500 psi) and under heat sufficient to fuse the strips together and/or emboss an optical or aesthetic texture on to the surface. The panel is then cooled and cut into its final shape. The resultant panel is then ready to be installed or fabricated into various architectural designs, dividers, door panels, lighting panels and other designs by standard wood fabrication methods.

Process II

Although Ram Wave processing is the preferred processing method of this invention, other methods maybe used for the multicolor coated recycled plastic materials. A hot press can be used by itself wherein the press is set at a temperature between the Tm and Tg of the transparent particles. Instead of uniformly filling the mold, a pile or piles of multicolor particles are poured onto the heated platen. Under heat and pressure, the material will deform but not flow creating various areas of elongation but still maintain discrete boundary conditions of the particles.

EXPERIMENTS

Experiment 1

Green Filtering: A modified PLA film processed using viscoelastic processing with a soybean hydrogenated wax were extruded into a 0.005" thick film. The film was then reverse printed using a solvent based inkjet printing system. A substrate of a smooth MDF and a substrates of a highly textured mineral wood composite were prepared and sprayed with a water based heat activated urethane adhesive. The thin film was low temperature formed using a vacuum forming system and fused of the surface of the composite substrate.

A second matching group of substrates were prepared and a standard PET and PVC film were applied.

The modified PLA samples fused to the substrates were evaluated by color using indoor light. The samples were taken outside into direct sunlight and a significant color shift was see wherein any printed image shifted to a very strong light green color. We believe this shows some optical or UV filter effect. We are also assuming at this time that this effect is caused due to the unique interface or chemical state at the interface of the ink and the PLA films. The PET samples were also submitted to outside light and shown no change in color.

Experiment 2

UV resistance and UV spectrophotometry: PLA has been tested for UV resistance by The Design Shop and by the primary manufacture of PLA (Cargill). Surprisingly, the UV resistance of PLA is better than the best petrochemical polymers including polycarbonate. In addition we obtained spectrophotometer work comparing a PET to a PLA showing very low to no absorbance in the UV spectra in both the UV A & B ranges as compared to high absorption with the PET in these ranges.

Experiment 3 change in crystalline and amorphous states: Although not limited to viscoelastic processing of PLA for surfacing, viscoelastic processing maintains a high degree of crystallinity within the PLA films. Viscoelastic processing integrates lower temperature processing or modified temperature profiles in combination with various additives including hydrogenated soybean wax that maybe acting as a nucleating agent. The resulting film is semitransparent, but also has a unique optical effect that highlights the decorative printing patterns of our material. In further, post processing such as thermofoiling, we see a definite change in clarity at 140 F to 180 F wherein, the Biolaminate film increases its clarity significantly. This can be adjusted by adjusting the range and processing parameters of thermofoiling.

Experiment 4

Polylactic acid pellets from Natureworks were placed into a mold and heated to its melting temperature under pressure creating a thin sheet. A second sheet was produced by means of standard extrusion processing. The material samples were subjected to photospectrometer tests. The results showed that the material transmitted UV frequencies into the UV A and UV B frequencies at high levels of UV transmission (over 90%) at the targeted 388 nano meter range.

Experiment 5

Polylactic acid pellets were layered into a sheet mold two pellets in depth. The mold was placed in an oven at 340 F for 8 minutes. The pellets first became "spherical" as they reach their softening point, but below their melt point. The pellets fused together and once cooled became a solid sheet of high integrity. The individual pellets were all in a spherical shape. The panel was then placed in a light fixture and compared to a standard acrylic light diffuser (crystal pattern). The light from the PLA sphere panels was highly dispersed at all angles whereas the standard acrylic panel shown a strong focus in the middle and quickly lowered in light intensity as the angle of your eye decreased.

Experiment 6

Cellulose acetate and polylactic acid were individually extruded into a sheet and measured for its UV transmission at 388 nm in comparison to acrylic. The acrylic was less than 10% transmission at this UV spectra whereas the PLA and cellulose acetate shown a very high degree of transmission greater than 90%.

Experiment 7

Nanoquartz was blended with PLA at a level of 10% by weight and extruded into a sheet sample. The sample was submitted to photospectroscopy. The material shown the same UV transparency as the neat PLA comparison sample with minimal loss in the UV A spectra.

Experiment 8

Nanoquartz mineral was coated over the surface of a polylactic acid sheet. The material was heated to a temperature above its Tg and below it melting point. The part was cooled. In using a brush on the surface to attempt to remove the quartz. Little to no quartz was removed from the surface.

Experiment 9 nanoTio2 photocatalytic mineral was coated on the top surface of an extruded PLA sheet. A UV light source was placed on the opposite backside of the PLA sheet. Smoke was blown into a container and placed on top of the PLA sheet. The photocatalytic reaction with UV light transferring through the UV transparent PLA reduced and eliminated the smoke in a matter of minutes.

Experiment 10

A low temperature extrusion process (320 F to 350 F) was used to extrude PLA into a thick sheet (0.040). The resultant material was measured for limited oxygen index. The result show the material to have an LOI of 25. A flame was then placed on the sample and taken away. The fire self-extinguished in less than one second.

Experiment 11

Sheets of PLA were subjected to ASTM E84 Steiner Tunnel testing for smoke index testing. The results showed very little to no smoke and the smoke was white in color. Reading for smoke index were 50. A similar thickness of PVC sheet was also tested in which the smoke was dense and very black measuring a smoke index over 400.

Experiment 12

Another panel of PLA was submitted to spectrophotometry in which the refractive index was measured and found to be much lower than acrylic.

Experiment 13

Regrind PLA from blow molding bottle production representing a particle size range from ⅛" to less than 0.1" that was in the form of random particle geometry was separated into two groups. A metallic copper paint was sprayed on the surface of one group of particles and a black paint sprayed on the second group. The bioplastic particles were then blended together. The admixture of multicolor particles were then placed into a sheet mold and into an oven at 370 degrees F. for over 1 hour. The material was then cooled to room temperature and removed from the mold. The resultant material was fused together with no air voids, but maintained individual particles and particle boundary conditions for each biocomposite particle. Each particle was also deformed in while being in an elastic state wherein the color coating "cracked" to show a novel aesthetic appearance and significant depth of field and semitransparency.

Experiment 14

Paper mill sludge in the form of "balled" materials (BioDac) was blended while a water based colorant was added during mixing. The colorant coated the papermill sludge in a non-uniform manor due to the difference of cellulose to clay ratios within each individual particle. This created a multicolor admixture. Neat PLA was extruded in a brabender extruder while 20% of the multicolored papermill sludge was added. Low shear and heat lower than the melting point of PLA was used to maintain the individual balled structure of the papermill sludge. The resultant material was ground into random geometries using a standard knife grinding system used in the plastics industry. The biocomposite particles were placed in a sheet molded and heated to 390 degrees F. then cooled. The resultant material also had distinct particle boundaries and surface microvoids simulating natural granite. The papermill sludge microballs were completely coated and the surface was a microlayer of the PLA biopolymer. The material was placed into water and was water proof with a hard surface.

Experiment 15

A metallic copper paint was sprayed on regrind PLA in which the tops and sides of the particles were covered. The material was placed into a sheet mold and heated to 380 degrees F. for 1 hour. The material was cooled using cold water. The particles deformed in to solid with separate particles and sharp boundaries between particles. The coating "crackled" on each particle creating gaps within each particle to show the clear PLA. This created a two level optical pattern that looked like a metal foil.

Experiment 16

PLA was extruded with papermill sludge wherein the papermill sludge was coated with a powdered fire retardant prior to extrusion. The resultant biocomposite particle were extruded and ground into random geometry particles containing the powdered fire retardant and paper millsludge in a non uniform nature with particles and "swirls" apparent in the biocomposite particles. The particles were placed into a mold and heated to 390 Degrees F. The resultant material was then subjected to fire by means of a torch. After the torch was held on the part for 1 minute it was removed. The material did now show any signs if liquid mobility and the flame went out by itself in less than 15 seconds.

Experiment 17

Alumina was coated with a water-based colorant wherein the particles of Alumina were approximately a 30 mesh size. The alumina was extruded and mixed with PLA at a temperature lower than the melting point of the PLA and with very low shear as not to fully mix or break down particles. The resultant material was ground using a knife grinder into random particles of size and geometry. Two separate batches of separate colors biocomposite particles were produced. The two color biocomposite particles were dry blended. One batch was placed in a thermal compression molding press and the other batch into the sheet mold that was placed into an oven. Although the material in the press formed a sheet, flow marks were seen and uneven melting was observed. Temperatures for both tests were at 350 degrees F. The material in the sheet mold only under gravity deformed into a solid, but individual particles were more defined and exhibited a look closer to granite. The material had very good burning characteristics as once submitted to flame for a minute after removal of the flame the fire self extinguished within 15-20 seconds. The alumina also provides for a harder more scratch resistance surface when dragging a weighted sharp object over the surface of the alumina biocomposite as the neat biocomposite.

Experiment 18

PLA was extruded into a rod and then after changing dies into a flat bar. While the hot PLA was coming out of the extruder a paint was applied to the surface of the material. The material was then ground into random geometry particles. The material was placed into an sheet mold and oven. The resultant material looked very different from other biocomposites tested wherein the single sided coating deformed, but uncoated side shown a depth and transparency in seeing the deformed shapes.

Experiment 19

PLA with multicolor-coated papermill sludge was extruded together and formed into a ⅛" extruded sheet. The material looked surprising like a Corian solid surface with uniform particle distribution. It did not look like the random particle geometry of the other biocomposites or natural stone, but clearly matched a standard Corian color.

Experiment 20

Cellulose waste paper was mixed with a clothing dye and water. The fibers were then dried. The colored fibers were compounded at a low percentage into the PLA as to show a semitransparent and random "fibrous" nature to the material. The material was ground into individual random particles. A second batch using different color cellulose was produced. The two colors of biocomposite particles were mixed and thermally fused into a solid surface material.

Experiment 21

A biocomposite particle was produced using PLA and a coated papersmill sludge by compounding and producing into a extruded form. The form was ground into individual random shaped biocomposite particles by means of a plastic grinder. Using a low shear extruder at a temperature of 320 degree F. (over 70 degrees lower than the PLA melting point) we extruded a shaped object profile used for edgebanding applications. The material had a three dimensional look and colorant was not needed to provide the overall color appearance of the material. The particle of papermill sludge was apparent within the semitransparent matrix to provide a look similar to that of a solid surface material.

Experiment 22

A biocomposite particle was produced using PLA and a bioplasticizer of soybean wax derived from soybean oil. Multicolored coated papersmill sludge was compounded with the PLA and bioplasticizer to create a soft, but semitransparent elastomeric biocomposite particle. These particles were fused into a sheet mold in and oven at a temperature of 300 degree F. to form a solid, but where individual particles boundaries could still be seen. The material was flexible and had a good slip resistance.

Experiment 23

Compact disc waste was ground and screened into random geometry particles ranging from a 20 mesh to a 100 mesh. Transparent regrind PLA was coated using two types of transparent paint wherein the outsides were completely coated and dried. The two materials were blended together and placed into a baking pan. The material was heated to 330 F for one hour in which this temperature was below the melting point of the CD waste, but above the melting point of the PLA. A top plate with weights were added to apply slight pressure onto the surface of the particles (10 psi). The fused composite was cooled. The resultant composite shows very distinct particle boundaries between the two materials providing a unique stone like depth of field and random fractal geometry. The particles of coated PLA deformed increasing the surface area to expose more of the clear portion of the particles providing a higher depth of field than the non fused starting material. Secondly, a clear protective film was placed over the fused composite sample and heated in a simple press at 320 F for 2 minutes. This allowed the surface film to fuse onto the surface of the composite without melting the composite sample.

Experiment 24

Recycled glass bottles were ground and screened into particle sizes from 4 mesh to 25 mesh. Compact disc waste was ground and screened into particles from a 25 mesh to 30 mesh. The CD particles were coated with a transparent paint color. Regrind polylactic acid was also obtained. The three discrete particles were blended together in a uniform equal mixture and placed into a metal mold and placed into an oven at 350 F for one hour. The PLA showed signs of melting whereas the small CD particles deformed slightly and glass particles stayed in as static position. The resultant material was completely translucent and had unique light defraction. The sample had no air bubbles within the discrete particle composite.

Experiment 25

PLA and reground CDs were screened into a mesh from 4 mesh to 20 mesh. The PLA was sprayed with transparent paint (Clear acrylic paint) The mixture was blended and placed into an oven at 350 F for one hour. A second similar batch was done, only the PLA was not coated. The results of the first batch shown individual particles with transparent boundaries like bubbles in water. The second sample without the coated particles looked like a solid clear mass with CD pieces floating in the matrix losing the discrete particle look.

Experiment 26

PLA pellets were spray coated with a clear transparent acrylic paint. A small branch from a pine tree was placed in the mold and the coated discrete particles were poured into the mold. A percentage of polycarbonate particles were also blended into the particles. The mold containing the mixed particles and pine tree branch was placed into an oven at 350 F for 1 hour. The resultant composite mass had no bubbles from outgasing of the pine branch moisture and the resultant pine branch was in a perfect three dimensional form as placed into the mold without any deformation. The polycarbonate particles were seen as shinny discrete particles that were only deformed and not melted or flowed together creating optical interfaces between each discrete particle.

Experiment 27

PLA pellets were obtained from Natureworks. A metal aluminum tray with side was made using thin aluminum. The PLA pellets filled the pan to a thickness of about 0.375 or about two layers. The pan was placed in an oven at a temperature of 350 degrees F. for about 8 minutes. The pellets softened and retained their round shape, but not to the point where the PLA fully melted and flowed. The material was then cooled. The final part was flat on the bottom where it was in contact with the pan, but hemispherical on the surface where the pellets softened but not fully melted. The panel was then placed in front of a light and a unique optical dispersion pattern was seen. In closer inspection a person could see the individual pellet boundaries, but the panel was fully fused into a single piece. The boundary condition between the pellets helped in scattering the lighting pattern and the hemispherical surfaces lensed the light individually.

What is claimed is:

1. A method for making a decorative fused particle translucent composite article, the method comprising:
    coating transparent regrind polylactic acid particles with a transparent paint;
    mixing recycled plastic particles of ground compact discs with the coated polylactic acid particles to form a bio-composite particle matrix admixture;
    putting the admixture into a mold;
    heating the mold to a temperature between approximately 200° F. and approximately 350° F. so as to cause fusing of the admixed particles;
    cooling the heated mold; and
    removing a translucent decorative composite article comprising the fused particles from the mold, the paint providing transparent particle boundaries within the article resembling bubbles in water.

2. The method of claim 1, further comprising coating the recycled plastic particles prior to said mixing.

3. The method of claim 1, further comprising adding decorative or functional fillers to the admixture.

4. The method of claim 1, wherein the mold is a flat mold and the removed decorative composite article is a sheet.

5. The method of claim 1, further comprising coating the decorative composite article with a protective film.

6. The method of claim 1, further comprising post forming the decorative composite article.

* * * * *